(12) United States Patent
Chen

(10) Patent No.: US 9,024,461 B2
(45) Date of Patent: May 5, 2015

(54) TIDAL ENERGY SEAWATER DESALINATION SYSTEM, POWER GENERATION SYSTEM AND INTEGRAL ENERGY UTILIZATION SYSTEM

(71) Applicant: Daqian Chen, Shanghai (CN)

(72) Inventor: Daqian Chen, Shanghai (CN)

( * ) Notice: Subject to any disclaimer, the term of this patent is extended or adjusted under 35 U.S.C. 154(b) by 148 days.

(21) Appl. No.: 13/661,180

(22) Filed: Oct. 26, 2012

(65) Prior Publication Data

US 2013/0291532 A1  Nov. 7, 2013

Related U.S. Application Data

(63) Continuation of application No. PCT/CN2011/071241, filed on Feb. 24, 2011.

(30) Foreign Application Priority Data

Apr. 28, 2010 (CN) .......................... 2010 1 0162024

(51) Int. Cl.
  *F03B 13/10* (2006.01)
  *F03B 13/12* (2006.01)
  (Continued)

(52) U.S. Cl.
  CPC ............... *F03B 13/262* (2013.01); *C02F 1/04* (2013.01); *C02F 2103/08* (2013.01);
  (Continued)

(58) Field of Classification Search
  CPC .......... F03B 13/262; F03B 13/26; C02F 1/04; C02F 2103/08; C02F 2301/063; C02F 1/14; C02F 2201/009; F03D 9/008; F05B 2220/62; F05B 2260/42; F05B 2220/702; Y02E 10/38; Y02E 10/72; Y02E 10/28; B01D 3/06; B01D 3/103

USPC .............................. 290/53, 42, 43, 54; 60/495
See application file for complete search history.

(56) References Cited

U.S. PATENT DOCUMENTS

| 3,580,814 A | 5/1971 | Green |
| 4,131,513 A | 12/1978 | Green |

(Continued)

FOREIGN PATENT DOCUMENTS

| CN | 1117562 | 2/1996 |
| CN | 1587689 | 3/2005 |

(Continued)

OTHER PUBLICATIONS

"Chinese Patent Application No. CN100458", First Office Action, Nov. 16, 2011—with explanation.

(Continued)

*Primary Examiner* — Javaid Nasri
(74) *Attorney, Agent, or Firm* — Kilpatrick Townsend & Stockton LLP

(57) ABSTRACT

A tidal energy seawater desalination system wherein a seawater evaporation tower is configured with a vacuum pump which connects with a tidal energy power device, and connects a seawater evaporation tower via pipelines, an output end of the pump connects a steam condensation tower via pipelines; alternatively the evaporation tower comprises a floating barrel and a stationary barrel, the floating barrel connects with the power device, the top of the stationary barrel connecting the steam condensation tower via pipelines; the pipeline introducing the steam into the condensation tower first connects a steam pressure tank, a steam turbine connects the tank via pipelines, the power output shaft of the turbine connects generator sets, and in turn, the turbine connecting the condensation tower via pipelines, such that the system is also a power generation system; on the offshore of which is provided with solar water heater and wind driven generator.

2 Claims, 16 Drawing Sheets

(51) Int. Cl.
  *H02P 9/04* (2006.01)
  *F03B 13/26* (2006.01)
  *C02F 1/04* (2006.01)
  *F03D 9/00* (2006.01)
  *B01D 3/06* (2006.01)
  *B01D 3/10* (2006.01)
  *C02F 103/08* (2006.01)
  *C02F 1/14* (2006.01)

(52) U.S. Cl.
  CPC ...... *C02F 2301/063* (2013.01); *F05B 2220/62* (2013.01); *Y02E 10/28* (2013.01); *Y02E 10/38* (2013.01); *F03D 9/008* (2013.01); *F05B 2220/702* (2013.01); *F05B 2260/42* (2013.01); *Y02E 10/72* (2013.01); *C02F 1/14* (2013.01); *C02F 2201/009* (2013.01); *B01D 3/06* (2013.01); *B01D 3/103* (2013.01)

(56) References Cited

U.S. PATENT DOCUMENTS

| | | | |
|---|---|---|---|
| 4,555,307 A | 11/1985 | Hagen | |
| 6,476,512 B1 * | 11/2002 | Rutta | 290/42 |
| 8,648,486 B2 * | 2/2014 | Daqian | 290/53 |
| 2004/0016631 A1 | 1/2004 | Madkour | |

FOREIGN PATENT DOCUMENTS

| | | |
|---|---|---|
| CN | 1843948 | 10/2006 |
| CN | 101139116 | 3/2008 |
| CN | 201704095 | 1/2011 |
| JP | 03196889 | 8/1991 |
| JP | 2009127439 A | 6/2009 |
| JP | 2013525678 A | 6/2013 |
| WO | 2011134302 | 11/2011 |

OTHER PUBLICATIONS

"PCT Application No. PCT/CN2011/071241", Search Report, Apr. 28, 2010.
"PCT Application No. PCT/CN2011/071241", Search Report, May 23, 2011.
Japanese Office Action mailed Feb. 25, 2014, from Japanese Application No. 2013-506458 (3 pages).
International Preliminary Report on Patentability mailed Nov. 8, 2012, from PCT Application No. PCT/CN2011/071241 (17 pages).
International Search Report and Written Opinion mailed Jun. 2, 2011, from PCT Application No. PCT/CN2011/071241 (14 pages).

* cited by examiner

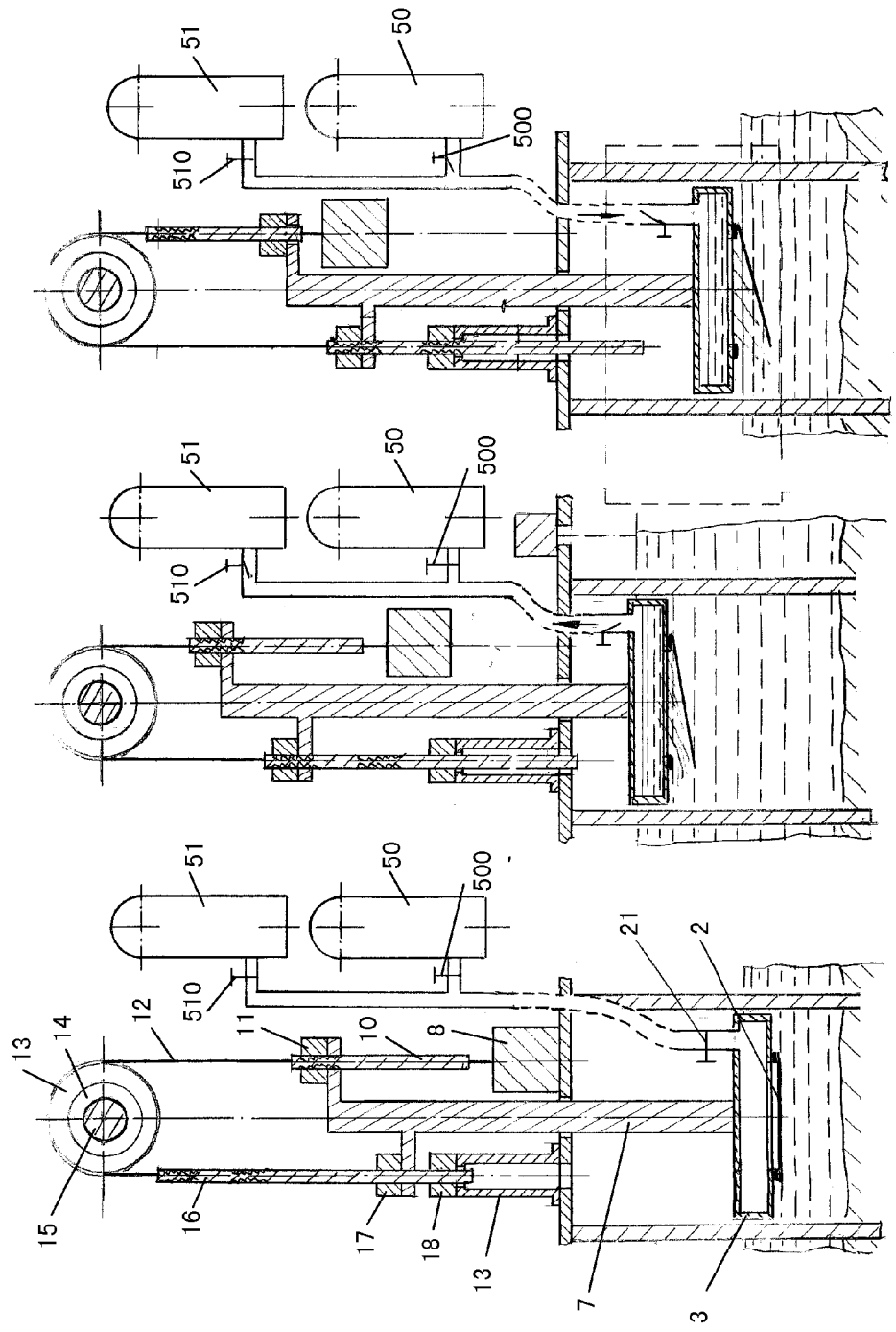

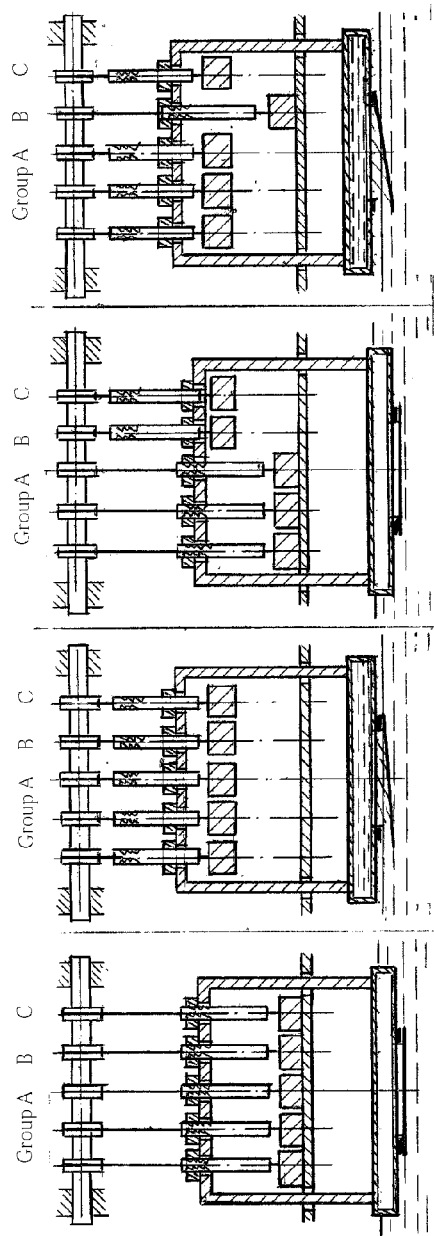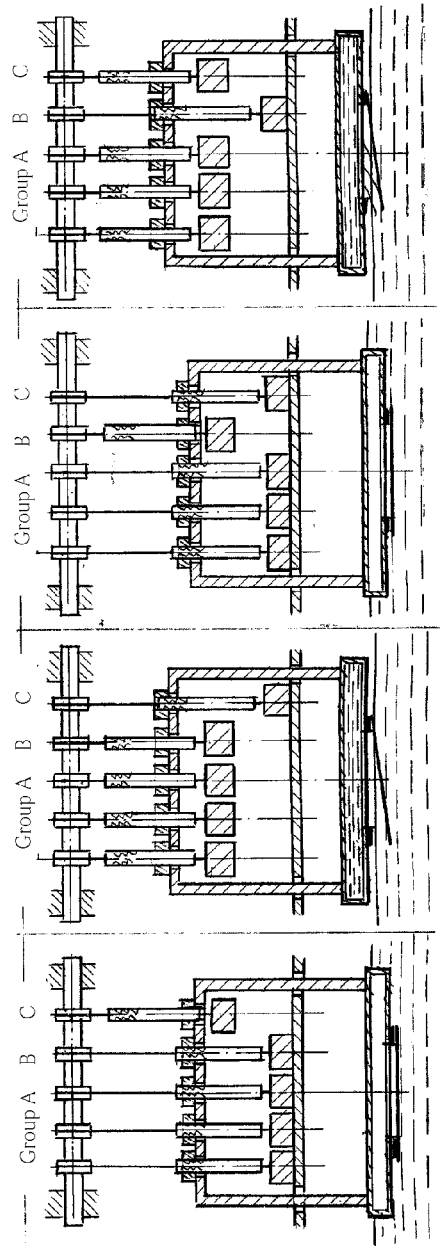

TIDAL ENERGY SEAWATER DESALINATION SYSTEM, POWER GENERATION SYSTEM AND INTEGRAL ENERGY UTILIZATION SYSTEM

The present application claims the priority of Chinese patent application No. 201010162024.9 filed on Apr. 28, 2010. The entire disclosures thereof are incorporated herein by reference.

FIELD OF THE INVENTION

The present invention relates to the system utilizing tidal energy, and more particularly, to the system which can perform seawater desalination, power generation, and also, to the system which can comprehensively utilize energy from tides, wind, and the sun.

BACKGROUND OF THE INVENTION

Tidal energy is renewable energy which is clean, environment-friendly and eco-friendly. And tides rise and fall each day, again and again, and the energy from tides is inexhaustible or be used without limit. Tidal energy is the potential energy of water formed by rising and falling of seawater, which is a relatively stable resource, and suffers scarcely from natural factors such as climates or hydrology. It can generate a steady amount of electricity, without dry years or wet years or being affected by wet or dry seasons, without the need of flooding vast farms to build reservoirs, thus without thorny problems such as population migration, flooding farms. Currently, the common tidal power generation with successful application is to use hydrogenerators to convert the potential and kinetic energy of seawater into electrical power. However, owing to that a tidal power plants need to be built at a bay with deep waters and long dams, there are plenty of difficulties in construction, foundation treatment, silting prevention and the like, and civil works and electromechanical equipments cost highly. Meanwhile, to continuously generate power during all day, two reservoirs are needed for the tidal power plant, which doubles the works and cost thereof and affects its development and the utilization of tidal energy. Furthermore, not all the sea surfaces are appropriate for building dams to generate electricity, thereby constricting greatly the availability of tidal energy. There is another way to utilize tidal energy: at rising and falling tide, a buoy performs a vertical movement respectively by a height equal to the difference of tide with its buoyancy when it is hermetic and empty, and with its gravity when it is full with water. The vertical movements of the buoy are transferred and converted so as to generate electricity. With a review of various inventions and designs with this principle, there are three types: (1) the buoy drives directly a piston of an air cylinder to press air into a pressure tank, thereby converting tidal energy into compressed air and store it for power generation. However, due to the limitation of the prior fabrication technology and cost to an air cylinder with a long stroke and a large diameter, the design has not yet been put into industrial applications. (The difference of a tide ranges from 2 m to 15 m, usually 4~5 m, while an air cylinder with a stroke longer than 2 m and a diameter larger than 0.4 m is quite hard to make and cost much, and do not adapt to industrial applications). (2) the buoy drives directly a piston of an hydraulic cylinder to lift sea water up to a reservoir at high location, thereby converting tidal energy into the potential energy of the water with high level for power generation. However, due to the limitation of the prior fabrication technology and cost to a hydraulic cylinder with a long stroke and a large diameter and due to the requirement of building a reservoir at high position, the design has not yet been put into industrial applications, either. (3) the buoy drives mechanisms like gears, racks to move, thereby converting the tidal energy into torque force to drive gear box for power generation. However, due to the limitation of the prior fabrication technology and cost to a mechanism with a long stroke and due to that it doesn't involve the energy storage mechanism, the design has not yet been put into industrial applications.

SUMMARY OF THE INVENTION

The purpose of the present invention is to overcome the disadvantages in the prior art, and make a breakthrough in the application of tidal energy. The overall conception is as follows: at first, utilizing tidal energy power devices as prime movers to desalinate seawater, then combining the seawater desalination with generation of electrical power by tidal power, and further combining wind force and solar energy so as to constitute a three-dimensional energy integral utilization system. Moreover, the present invention further improves the tidal energy power devices to realize the industrial application of the tidal energy. According to this conception, the present invention provides a tidal energy seawater desalination system, characterized in that it comprises a tidal energy power device, a seawater evaporation tower and a steam condensation tower, in which the seawater evaporation tower is configured with a vacuum pump which connects with a power output shaft of the tidal energy power device such that the tidal energy power device is capable of driving the vacuum pump to work, the vacuum pump connecting the seawater evaporation tower via pipelines, the output end of the vacuum pump connecting the steam condensation tower via pipelines, and the steam condensation tower connecting a fresh water receiver via pipelines. In the tidal energy seawater desalination system according to the present invention, the tidal energy power device drives the vacuum pump to suck air in the seawater evaporation tower such that there is negative pressure formed in the seawater evaporation tower, in which negative pressure, seawater vapors quickly. The vacuum pump further sucks the evaporated steam and delivers it to the steam condensation tower. Steam in the steam condensation tower is condensed into fresh water which is received by the fresh water receiver such that fresh water is one of the main products of the present invention. The seawater in the seawater evaporation tower, after being evaporated considerably, becomes strong brine which can be used to produce edible salt. Accordingly, the present invention further gains a byproduct, i.e. edible salt. The tidal energy seawater desalination system, further characterized in that the seawater evaporation tower is configured with a heating device, which preheats the seawater entering the seawater evaporation tower. Because the seawater is heated by the heat device, it can vapor more quickly under negative pressure. The tidal energy seawater desalination system, further characterized in that the tidal energy power device comprises at least one system unit which comprises an energy storage component, and further comprises a buoy having a empty cavity, a controlled intake and exhaust valve at its bottom and a controlled intake and exhaust valve at its top; a ratio lifting system, comprising a buoy bracket connecting with the buoy, a lifting member, a clutch for lifting member, a flexible transmission member, a pulley, a transmission spindle, a lowering member, and a clutch for lowering member, in which the flexible transmission member detours the pulley and hangs the lifting member and the lowering member at the two sides of the pulley respectively, at the two sides of the buoy bracket is provided with the clutch for lifting member, by means of which the buoy bracket is connected releasably to the lifting member, and the clutch for lowering member, by means of which the buoy bracket is connected releasably to the lifting member, and the lifting member connects the energy storage component; and a power output shaft associated with the energy storage component, which is driven by the energy storage component when the latter is falling. The tidal energy seawater desalination system controls the engagement between the clutches and their corresponding members by means of a control system such as an electromagnetic control system: at rising tide, shutting both valves of the buoy, with the buoy being a hermetic empty, controlling the clutch for lifting member to engage with the lifting member, and releasing the clutch for lowering member and the lowering member, such that the energy storage component of the tidal energy power device together with the buoy descends with the rising of tide; at high tide, opening the valves such that tide water fills the buoy quickly; at falling tide, shutting the valves such that the buoy becomes hermetic and water-filled, and controlling the clutch for lifting member to disengage with the lifting member, and engaging the clutch for lowering member with the lowering member, the buoy falling under gravity and drawing the lowering member to move in the direction opposite to the energy storage component, such that the energy storage component rises again, and reaches a height twice the tide difference, storing potential energy. Finally, the energy storage component falls to drive the power output shaft, thereby the tidal energy gets fully used.

The tidal energy seawater desalination system, further characterized in that the pulley is a ratchet wheel, the inner ring of which is fixed on the transmission spindle, and the outer ring of which is detoured by a flexible transmission member which drives the outer ring; the transmission direction is along the falling direction of the energy storage component; the energy storage component is capable of driving the ratchet wheel when it falls. When the energy storage component ascends, the outer ring of the ratchet wheel rotates with the flexible transmission member while the inner ring thereof does not move. When the energy storage component descends, the outer ring of the ratchet wheel rotates with the flexible transmission member and drives the inner ring thereof to turn. The inner ring of the ratchet wheel, in turn, drives the transmission spindle to work, which spindle then drives the vacuum pump to work. The tidal energy seawater desalination system, further characterized in that the system unit has an offshore platform, on which is installed with the buoy and the ratio lifting system; the lifting member connects the energy storage component via the flexible drawing member, which extends to a position away from the offshore platform and detours the pulley to hang the energy storage component. With the buoy and the ratio lifting system installed on the offshore, the energy storage component connecting flexibly with the ratio lifting system, and only the flexible drawing member extending to the place away from the offshore platform, it is possible to separate the tidal energy storage portion from the seawater desalination portion. Accordingly, the field that the system of the present invention occupies can be selected flexibly, and it is unnecessary for seawater desalination to work beneath the sea, hence simplifying significantly the construction and reducing the cost.

The tidal energy seawater desalination system, further characterized in that the system unit has an offshore platform, on which is installed with the buoy and the ratio lifting system; the flexible drawing member extends to a position away from the offshore platform where it detours the ratchet wheel to hang the energy storage component; the inner ring of the ratchet wheel is fixed on the transmission spindle, and the outer ring thereof is detoured by a flexible transmission member which drives the outer ring; the transmission direction of the ratchet wheel is along the falling direction of the energy storage component; the energy storage component is capable of driving the ratchet wheel when it falls.

The buoy and the ratio lifting system installed on the offshore, the energy storage component connecting flexibly with the ratio lifting system, and only the flexible drawing member extending to the place away from the offshore platform make it possible to separate the tidal energy storage portion from the seawater desalination portion. Accordingly, the field that the system of the present invention occupies can be selected flexibly, and it is unnecessary for seawater desalination to work beneath the sea, hence simplifying significantly the difficulty of construction and reducing the cost.

The tidal energy seawater desalination system, further characterized in that the flexible drawing members of the energy storage components of a plurality of system units detour the ratchet wheels and are provided on the same transmission spindle.

The tidal energy seawater desalination system, further characterized in that the flexible drawing member extends away from the offshore platform to a position on the land, at which there is formed with a pit beneath the energy storage component.

According to the aforementioned conception, the present invention further provides a tidal energy seawater desalination system, characterized in that it comprises a tidal energy power device, a seawater evaporation tower and a steam condensation tower, in which the seawater evaporation tower comprises a floating barrel and a stationary barrel; the floating barrel is capable of moving up and down relative to the stationary barrel, and between the floating barrel and the stationary barrel is sealed by sealing components; the floating barrel connects with the power take-off member of the tidal energy power device, such that the tidal energy power device is capable of drive the floating barrel to move relative to the stationary barrel; the bottom of the stationary barrel is used for receiving seawater, while the top thereof connects the steam condensation tower via pipelines; the steam condensation tower connects a fresh water receiver via pipelines.

The floating barrel is driven by the tidal energy power device such that the space between the floating barrel and the stationary barrel varies. If the space becomes greater, there is negative pressure formed, and in such negative pressure, seawater in the stationary barrel vapors quickly, then steam is delivered to the steam condensation tower. The steam in the steam condensation tower is condensed into fresh water which is in turn received by the fresh water receiver such that fresh water is one of the main products of the present invention. The seawater in the seawater evaporation tower, after being evaporated considerably, becomes strong brine which can be used to produce edible salt. Accordingly, the present invention further gains a byproduct, i.e. edible salt.

The tidal energy seawater desalination system, further characterized in that the tidal energy power device comprises at least one system unit which comprises an energy storage component, and further comprises a buoy having a empty cavity, a controlled intake and exhaust valve at its bottom and a controlled intake and exhaust valve at its top; a ratio lifting system, comprising a buoy bracket connecting with the buoy, a lifting member, a clutch for lifting member, a flexible transmission member, a pulley, a transmission spindle, a lowering member, and a clutch for lowering member, in which the flexible transmission member detours the pulley and hangs the lifting member and the lowering member at the two sides of the pulley respectively, at the two sides of the buoy bracket is provided with the clutch for lifting member, by means of which the buoy bracket is connected releasably to the lifting member, and the clutch for lowering member, by means of which the buoy bracket is connected releasably to the lifting member, and the lifting member connects the energy storage component; and an offshore platform, on which is installed with the buoy and the ratio lifting system, with the seawater evaporation tower and the steam condensation tower on the land; the flexible drawing member extends away from the offshore platform to a position on the land, where it is guided by the pulley to hang the floating barrel.

The tidal energy seawater desalination system, further characterized in that the flexible drawing member, extends away from the offshore platform to a position on the land, where it is guided by the ratchet wheel to hang the floating barrel; the inner ring of the ratchet wheel is fixed on the transmission spindle, and the outer ring thereof is detoured by a flexible transmission member which drives the outer ring; the transmission direction of the ratchet wheel is along the falling direction of the floating barrel; the floating barrel is capable of driving the ratchet wheel when it falls.

According to the aforementioned conception, the present invention further provides a tidal energy seawater desalination and power generation system, characterized in that it comprises the aforementioned tidal energy seawater desalination system, and the tidal energy seawater desalination system further comprises a steam pressure tank and a steam turbine; the pipeline introducing the steam into the steam condensation tower first connects the steam pressure tank such that the steam pressure tank receives and stores steam; the steam turbine connects the steam pressure tank via pipelines, so as to receive the steam output from it; the power output shaft of the steam turbine connects the generator sets, and in turn, the steam turbine connects the steam condensation tower via pipelines.

According to the aforementioned conception, the present invention further provides a three-dimensional energy integral utilization system with tide energy, wind force and solar energy, characterized in that it comprises the aforementioned tidal energy seawater desalination system, and the tidal energy seawater desalination system further comprises a steam pressure tank and a steam turbine; the pipeline introducing the steam into the steam condensation tower first connects the steam pressure tank such that the steam pressure tank receives and stores steam; the steam turbine connects the steam pressure tank via pipelines, so as to receive the steam output from it; the power output shaft of the steam turbine connects the generator sets, and in turn, the steam turbine connects the steam condensation tower via pipelines; on the offshore platform is installed with a solar heater and a wind driven generator, and the solar heater connects with the seawater evaporation tower via pipelines for heating the seawater flowing into the seawater evaporation tower; the wind driven generator is in electric connection with an electrical heating device of the tidal energy seawater desalination system.

The three-dimensional energy integral utilization system with tide energy, wind force and solar energy, further characterized in that in the tidal energy seawater desalination system, the seawater evaporation tower is configured with an electrical heating device, and/or the steam pressure tank is configured with an electrical heating device.

The three-dimensional energy integral utilization system with tide energy, wind force and solar energy, further characterized in that it further comprises a tidal power generation system which comprises at least one system unit, which system unit comprises an energy storage component, and further comprises a buoy having a empty cavity, a controlled intake and exhaust valve at its bottom and a controlled intake and exhaust valve at its top; a ratio lifting system, comprising a buoy bracket connecting with the buoy, a lifting member, a clutch for lifting member, a flexible transmission member, a pulley, a transmission spindle, a lowering member, and a clutch for lowering member, in which the flexible transmission member detours the pulley and hangs the lifting member and the lowering member at the two sides of the pulley respectively, at the two sides of the buoy bracket is provided with the clutch for lifting member, by means of which the buoy bracket is connected releasably to the lifting member, and the clutch for lowering member, by means of which the buoy bracket is connected releasably to the lifting member, and the lifting member connects the energy storage component; an offshore platform, on which is installed with the buoy and the ratio lifting system, the flexible drawing member extending to a position away from the offshore platform where it detours the ratchet wheel and connects the energy storage component the inner ring of the ratchet wheel fixed on the transmission spindle, and the outer ring thereof detoured by a flexible transmission member which drives the outer ring, the transmission direction of the ratchet wheel being along the falling direction of the energy storage component, and the energy storage component is capable of driving the ratchet wheel when it falls; and generator sets connecting with the transmission spindle and are driven by the transmission spindle to generate electricity; wherein at least a part of the transmission spindle of the tidal power generation system shares the same spindle with that of the tidal energy seawater desalination system.

The offshore platform built above the sea surface may serve to support the tidal energy storage equipments. But the tidal power generation equipments only cover relatively small area of the platform surface, therefore, the platform surface can be utilized as "a solar collection field", above the platform as "a wind power collection field", below the platform as "a tidal energy collection field", thereby forming "a three-dimensional space for integrally utilizing energy". It reduces the cost of tidal power generation system and solves the problems of occupying large area of land and high operation cost existing in wind power and solar power. Because of the combination among wind power, solar power, and tidal power, the output way of the wind energy and solar energy changes, that is, there is no need to output the wind electricity separately from the solar electricity, but the electrical energy produced by wind force is utilized directly for heating the seawater in "the seawater evaporation tower" without the use of inverters, and the solar energy is utilized directly for heating seawater by means of a coil pipe heater, and sends the heated water into "the seawater evaporation tower" without the conversion into electrical power. Having been heated by wind power and solar energy, seawater can evaporate in a higher rate and be converted into more steam, which improves the generation capacity of the tidal power generation system. The integral utilization of the three-dimensional energy can reduce significantly the cost of the system in investment and operation, and make it possible to utilize industrially clean renewable natural energy integrally. The integral utilization of the three-dimensional energy solves the problem that wind power and solar power must employ huge battery groups and inverters, and produces fresh water and sea salt as well as electricity.

The above-mentioned purposes, features and technical effects will be described in detail in conjunction with the drawings and preferable embodiments hereinafter.

BRIEF DESCRIPTION OF THE DRAWINGS

The particular features and functions of the present invention will be given through the following embodiments and drawings.

FIG. 7a illustrates a fourth embodiment according to the present invention—a power generation system with tide buoyancy and gravity ratio energy storage at low tide, when the buoy is empty.

FIG. 7b illustrates the fourth embodiment at high tide when the buoy is filled with water.

FIG. 7c illustrates the fourth embodiment at falling tide when the buoy is discharging water.

FIG. 9a illustrates the state of the energy storage components of the fifth embodiment at initial stage of low tide.

FIG. 9b illustrates the state of the energy storage components of the fifth embodiment at a first stage of rising tide—falling tide. FIG. 9c illustrates the state of the energy storage components of the fifth embodiment at the first stage of rising tide—low tide.

FIG. 9d illustrates the state of the energy storage components of the fifth embodiment at a second stage of rising tide—falling tide.

FIG. 9e illustrates the state of the energy storage components of the fifth embodiment at the second stage of rising tide—low tide.

FIG. 9f illustrates the state of the energy storage components of the fifth embodiment at a third stage of rising tide—falling tide.

FIG. 9g illustrates the state of the energy storage components of the fifth embodiment at the third stage of rising tide—low tide.

FIG. 9h illustrates the state of the energy storage components of the fifth embodiment at a fourth stage of rising tide—falling tide.

DETAILED DESCRIPTION OF THE INVENTION

Figure 1:
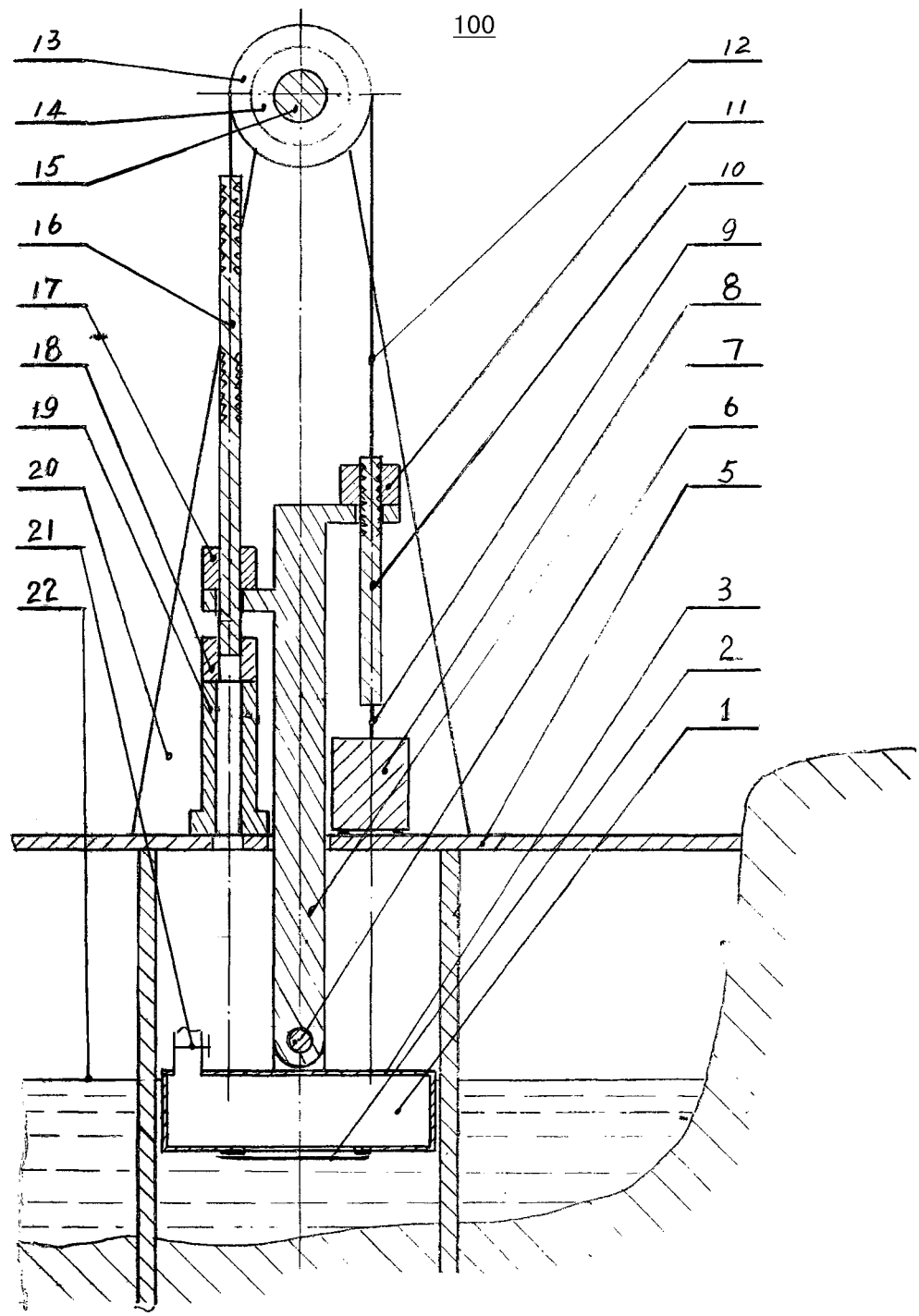
FIG. 1 illustrates a first embodiment according to the present invention—a power generation system with tide buoyancy and gravity ratio energy storage.
Figure 2:
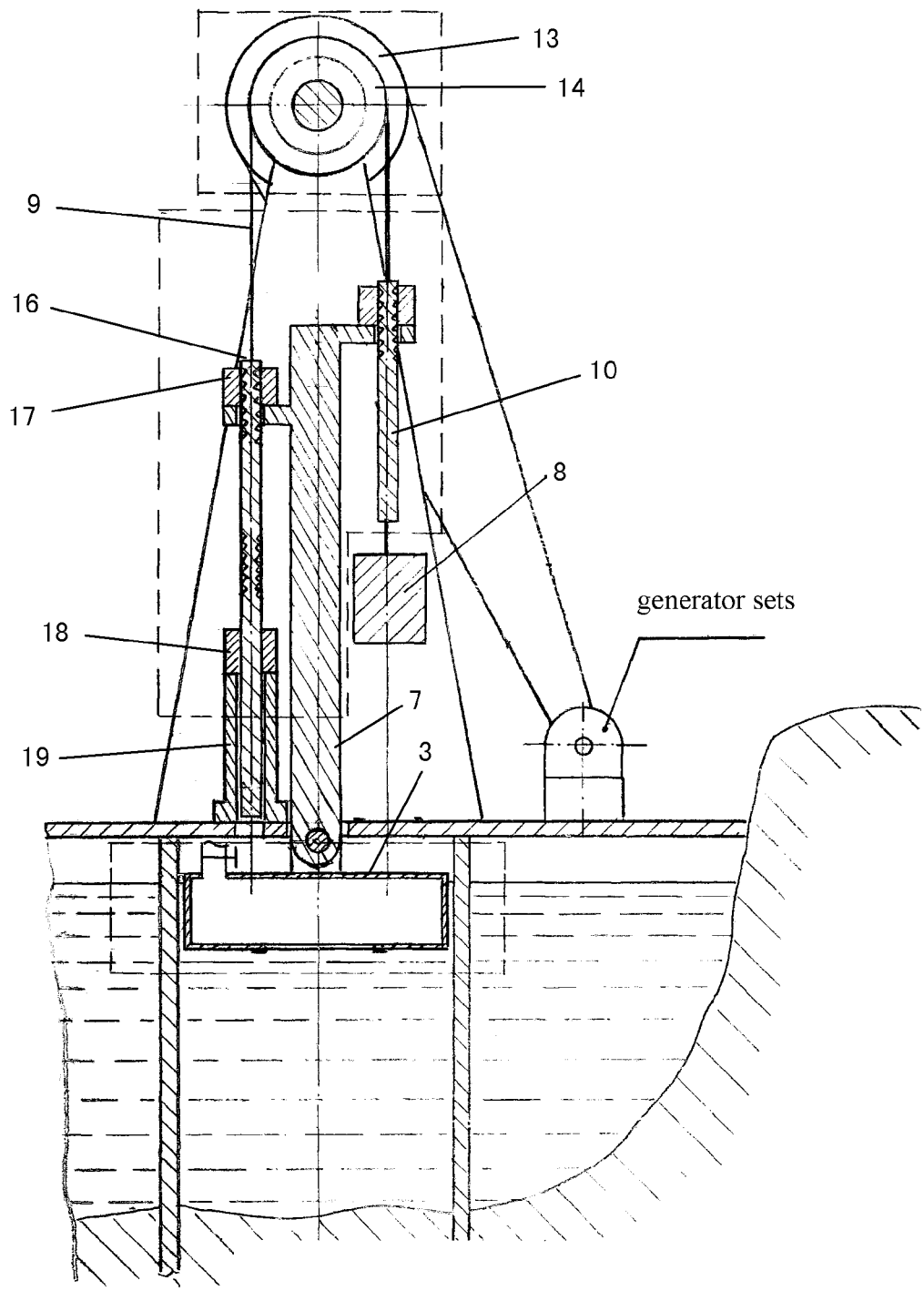
FIG. 2 illustrates the first embodiment at high tide when the buoy is empty.
Figure 3:
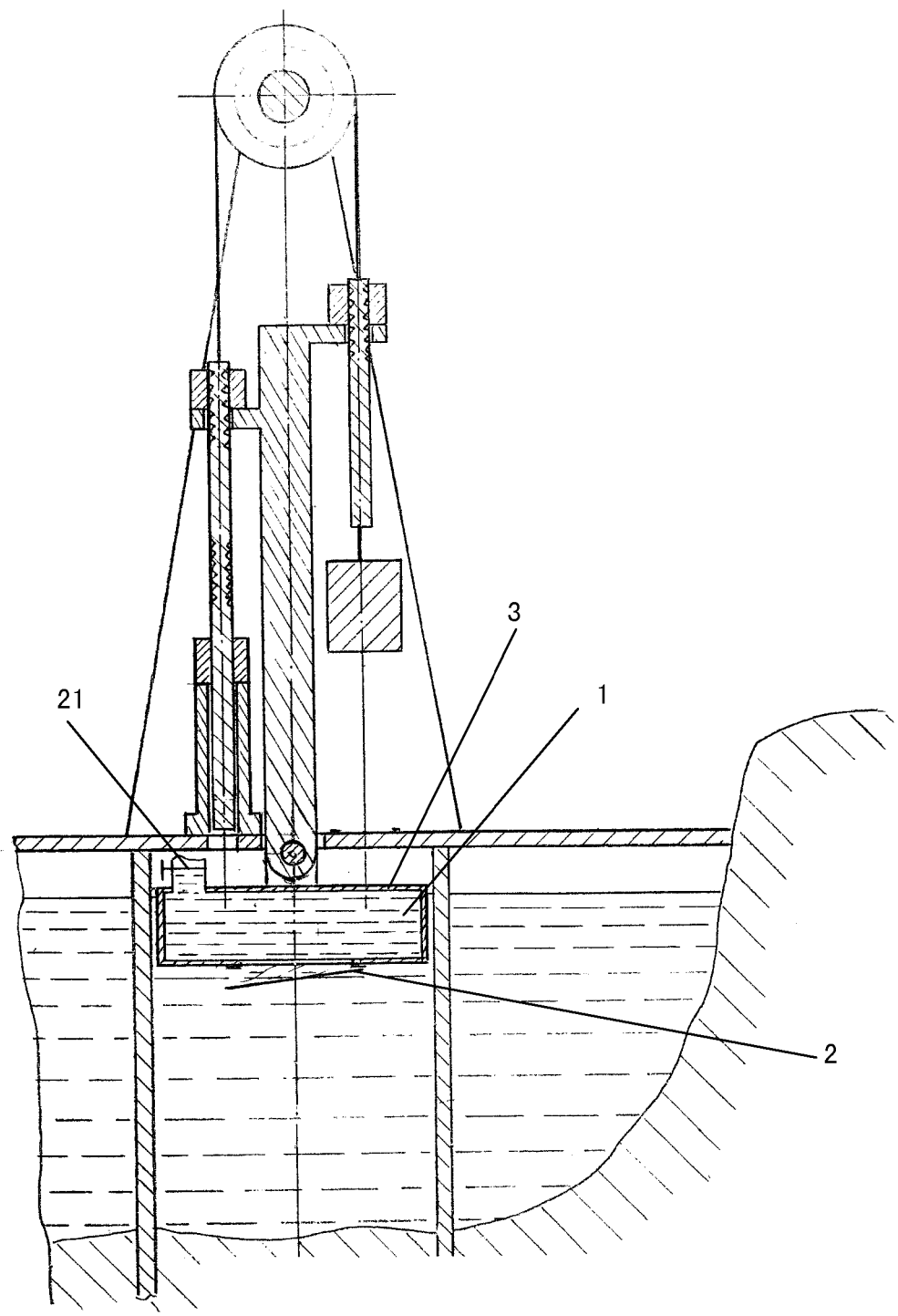
FIG. 3 illustrates the first embodiment at high tide when the buoy is filled with water.
Figure 4:
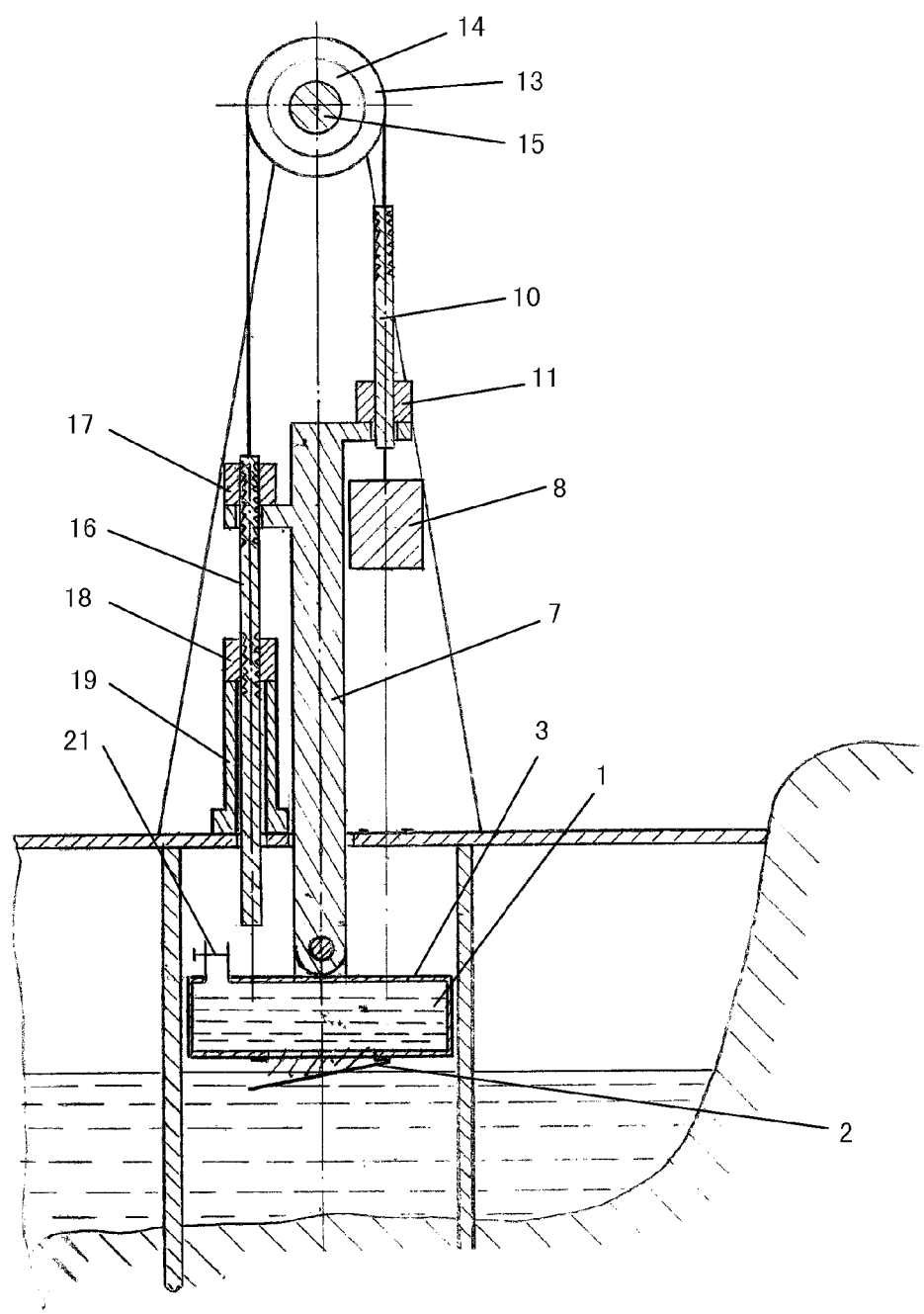
FIG. 4 illustrates the first embodiment at falling tide when the buoy is discharging water.

With reference to FIG. 1 to FIG. 4, the method of power generation with tide buoyancy and gravity ratio energy storage according to the present invention includes several steps which are performed repeatedly, the cycle thereof equal to a tide cycle. A tide cycle includes stages of initiation, rising tide, high tide, and falling tide. The method includes:

step a: at initiation stage as illustrated in FIG. 1, making the buoy 3 hermetic and empty;

step b: at rising tide, with reference to FIGS. 1 and 2, converting the potential energy of the buoy 3 rising by buoyancy into the gravitational potential energy of the energy storage component 8;

step c: as illustrated in FIG. 3, when close to high tide or at high tide, filling the buoy 3 with water: opening the upper valve 21 and the lower valve 2, then tide water entering the buoy through the lower valve 2, the air in the cavity of the buoy being discharged through the upper valve 21 such that tide water fills the buoy quickly;

step d: still referring to FIG. 3, at falling tide, closing the upper valve 21 and the lower valve 2 such that the buoy 3 becomes a hermetic body with water filled, and converting the potential energy of the buoy 3 falling under gravity into the gravitational potential energy of the energy storage component;

step e: as shown in FIG. 4, converting the gravitational potential energy of the energy storage component into electrical energy; and step f: repeating the above steps when next tide arrives.

Corresponding to the method of the present invention, FIG. 1 to FIG. 4 illustrate a power generation system with tide buoyancy and gravity ratio energy storage, which may be configured by at least one system unit 100 shown in FIG. 1 to FIG. 4. The system unit 100 includes a buoy 3 and an energy storage component 8, and corresponding to the step b, further includes an primary energy conversion device, which converts the potential energy of the buoy 3 rising by buoyancy into the gravitational potential energy of the energy storage component 8; and corresponding to the step c, further includes an ratio energy conversion device, which converts the potential energy of the water-filled buoy 3 falling under gravity into the gravitational potential energy of the energy storage component 8; and corresponding to the step e, further includes a power generation device, which converts the gravitational potential energy of the energy storage component 8 into electrical energy. The buoy control device, the primary energy conversion device, the ratio energy conversion device and the power generation device are illustrated in the preferable embodiment in FIGS. 1-4, but not limited to it. The skilled person in the art may make any modification or alternation for the devices of the system within the spirit of the present invention.

As shown in FIG. 1, the buoy 3 has an empty cavity 1, and an upper valve (intake and drainage valve) 21 and a lower valve (intake and exhaust valve) 2. The upper valve 21 and the lower valve 2 can be but not limited to solenoid valves. Logic control units like PLC may control execution units, for instance, driving mechanisms, hydraulic or pneumatic driving units, to close or open the upper valve 21 and the lower valve 2. For the purpose of clear observation, the logic control units, and the execution mechanisms are not shown. The upper valve 21, the lower valve 2, and the corresponding logic control units and execution mechanisms constitute the buoy control device of the power generation system with tide buoyancy and gravity ratio energy storage. The buoy control device may close the upper valve 21 and the lower valve 2 in step a of the aforementioned method, and open them in the step c, and in turn close them again in step d. More details about the process will be described thereafter. The logic control units and execution mechanisms of the buoy control device could be integrated in some cases. The aforementioned is not to exhaust the embodiment of the buoy control device, the person skilled in the art could according to the spirit of the invention in face of particular case select or combine the prior art to configure various kinds of the control device to open or close the buoy 3.

Still referring to FIG. 1, the primary energy conversion device includes a buoy bracket 7, a lifting member 10 and a clutch for lifting member 11. The buoy bracket 7 connects the buoy 3 via a pivot shaft 6, and they both may rotate about the shaft 6, such that this flexible connection can adapt to the swing of the buoy 3 caused by tide water. The buoy bracket 7 is provided with a clutch for lifting member 11 by means of which it can join releasably with the lifting member 10, and a clutch for lowering member 17 by means of which it can join releasably with lowering member 16. But it will be understood through the description for the working process that the buoy bracket 7 may not connect to lifting member 10 and lowering member 16 at the same time. The lifting member 10 hangs the energy storage component 8 at its lower end by rope 9 (a flexible drawing member), and connects with the right end of rope 12 (a driving flexible member) at its upper end. The length of the rope 9 is schematically shown, and it will be understood that the length thereof is far longer than that shown in the drawings. The engagement between the clutch for lifting member 11 and the lifting member 10 or between the clutch for lowering member 17 and the lowering member 16 can be of various ways. The lifting member 10 and the lowering member 16 are both tie rods. For example, tie rods 10 and 16 are formed with ratchets, and correspondingly, clutches 11 and 17 are also formed with matching ratchets. In some of the embodiments thereafter, the lifting member 10 is referred to as lifting ratchet rod, lifting rod, ratchet rod, or simplified as tie rod, and the lowering member 16 is referred to as lowering ratchet rod, lowering rod, ratchet rod, or simplified as tie rod. Correspondingly, the clutch 11 and the clutch 17 are respectively referred to as clutch for lifting ratchet rod 11 and clutch for lowering ratchet rod 17, or both simplified as clutch.

The energy storage component 8 is depicted as a square in the drawings, but its shape is not limited to it. The energy storage component 8 can be supplied with very low cost, such as using soil, sand, seawater or the like, and can be referred to as solid energy storage component, because it needs no longer running water to store energy as that in the prior art. It will be understood through the following description that the energy storage component 8 stores gravitational potential energy mainly via gaining a lifting height, and its weight is equal to the displacement of the buoy, and its material depends on the requirement of the overall structure on its volume. When the overall structure requires the volume of the energy storage component to be relatively small, metals, even heavy metals may be employed; when there is no requirement on its volume, concrete or even pebble, gravel, soil or water may be employed, so as to reduce the cost. Ropes 9 and 12 may be flexible members constituted by any materials with high tensile strength, such as steel wire rope, fiberglass, chains.

Still referring to FIG. 1, a ratio energy conversion device includes a buoy bracket 7, a lowering member 16 and a clutch for lowering member 17. Rope 12 is guided by ratchets 13, 14, and connects to the upper end of the lowering member 16 at its left end. The lower end of the lowering member 16 may connect releasably to the clutch for lowering member 17 and positioning clutch 18, but not at the same time. The positioning clutch 18 is fixed on connecting seat 19 mounted on platform which is higher than the horizontal plane 22. The buoy bracket 7 connecting with the buoy 3 can go up and down along with it. The connecting seat 19 has a through hole, through which the lowering member 16 can move up and down without any restriction.

Still referring to FIG. 1, the power generation device includes a generator (not shown in the drawing) and ratchet wheels 13, 14. The ratchet wheels 13, 14 includes outer ring 13 and inner ring 14, in which the outer ring 13 functions as a pulley wheel and is detoured by the flexible member 12. There can be just unidirectional transmission between the ratchet wheels 13 and 14, and in the drawing, the direction of the unidirectional transmission is clockwise, i.e. the falling direction of the energy storage component 8. The inner ring 14 of the ratchet wheel is mounted on spindle 15, which may rotate synchronously along with the former.

Said clutches 11, 17, 18 and the control device controlled by the buoy may be provided integrally (the following description bases on this integral manner and all the devices controlling them are referred to as control device) or separately, and the skilled in the art can, depending on demand, choose control devices with any control manner such as electrically, pneumatically, hydraulically.

Hereinafter, an operating cycle of the power generation system with tide buoyancy and gravity ratio energy storage according to the present invention will be described in conjunction with FIGS. 1-4.

FIG. 1 shows the system in the initial stage of the tidal cycle when the lower valve 2 and the upper valve 21 are both closed, the cavity 1 is hermetic body, and the buoy 3 is in seawater under the pressure from the energy storage component 8, full filled with air to make the buoy 3 in state of hermetic empty pontoon, and with its upper surface just above the seawater. Meanwhile, the gravity of the energy storage component 8 is applied to the buoy bracket 7 via the engagement between the clutch 11 and the tie rod 10, and the buoyancy which the buoy 3 is subjected to is equal to the gravity. At rising tide, the buoy 3, subjected to greatest buoyancy, begins to rise, and the buoy bracket 7 rises therewith, when the buoy bracket 7 connects the lifting member 10 via the clutch for lifting member 11, while it disengages with the lowering member 16, that is, both the clutch for lowering member 17 and the positioning clutch 18 are released. Because the tie rod 10 is joining with the buoy bracket 7, it rises at the same time, along with which the energy storage component 8 begins to lift and thus to store the gravitational potential energy. The lowering member 16, linked with the lifting member 10 via rope 9 and always moving along the direction opposite to the lifting member 10, thus begins to fall. Moreover, the energy storage component drives the outer ring 13 of the ratchet wheel rotate reversely to the spindle, the spindle 15 and the inner ring 14 of the ratchet wheel remaining static.

As depicted in FIG. 2, the buoy 3 reaches close to the highest position when the first energy storage of the energy storage component 8 is finished. Comparing FIG. 2 with FIG.

1, it will be found that the energy storage component 8 has ascended by a height roughly equal to the difference of the tide.

As shown in FIG. 3, at high tide, the control devices open the lower valve 2 and the upper valve 21, and tide water fully fill the cavity 1 quickly.

While the tide water begins to recede, owing to that after the buoy 3 is fully filled, the control devices close the lower valve 2 and the upper valve 21, the buoy 3 may be referred to as a heavy hermetic body filled with water, the weight of which is greater than that of the energy storage component 8. During falling tide, the buoy 3 descends under the gravity thereof. Meanwhile, the clutch 17 is closed, and the buoy bracket 7 joins with the lowering rod 16, while the clutch for lifting member 11 and the positioning clutch 18 are released. Therefore, when the buoy 3 falls, the buoy bracket 7 and the lowering rod 16 descend while the lifting member 10 and the energy storage component 8 ascend. When the buoy 3 falls 0.2 m close to the surface of low tide, the clutch 17 is closed and grips the tie rod 16 and at the same time the clutch 18 on the platform is closed and grips the tie rod 16 as well, such that the buoy stopped at the position approximate to the sea level. At this time, the elevation height of the energy storage component 8 is the difference of the tide minus the height of the buoy. Where the height of the buoy is far less than the difference of the tide, the elevation height of the energy storage component 8 approximately equals the difference of the tide, therefore, the total elevation height of the energy storage component 8 approximately equals the double of the difference of the tide, realizing "ratio elevation", thus realizing the ratio energy storage.

As shown in FIG. 4, when the lower valve of the buoy is about 0.2 m above the sea level, the clutches 17, 18 are controlled to stop the buoy and the lower valve 2 and the upper valve 21 are opened at the same time. After the sea water was drained, the lower valve 2 and the upper valve 21 is shut and the buoy 3 restores empty. Meanwhile, the clutches 17, 11 are released and the empty and hermetic buoy 3, under its gravity, descends into the sea, and returns to its initial position, ready for next tidal cycle. At this time, the positioning clutch 18 is closed and grips the upper rod 16, and the energy storage component 8 is kept at the highest position. Before next tide comes (that is, at the still tide), the energy storage component 8 can be released sequentially according to the procedures, so as to achieve continuous power generation, in which the releasing way for the component 8 will be described hereinafter. After releasing the energy storage component 8, i.e. after releasing the clutch 18, the component 8 descends, and drives the outer ring 13 of the ratchet to rotate, which outer ring 13 drives the whole ratchet wheel to rotate anticlockwise, which ratchet wheel drives generators or generator sets to generate electricity, thereby the gravitational potential energy of the energy storage component 8 is converted into electrical energy. This method converts the tidal energy directly into rotation torque of the main spindle, which actuate directly speed reducers so as to drive generators to generate electricity, without using power machines like hydraulic turbines, turbomachines to convert hydroenergy into electrical energy, thus improving the energy conversion efficiency, simplifying devices and reducing the cost significantly.

According to the previous description, during the rising tide and falling tide, the energy storage component 8 is subjected to the buoyancy of the empty buoy and the gravity of the water-filled buoy respectively, and under the effect of the primary energy conversion device and the ratio energy conversion device, it is lifted to a height twice the tide difference H, the weight of the energy storage component is equal to the discharge capacity of the buoy, therefore accomplishing the transmission and storage from the energy of the tide difference to the energy storage component. During the process, there is little energy loss, and owing to that the lifting height is twice the difference of the tide, the potential energy in the energy storage component is twice the tidal energy that the buoy covers (E=mg2H, where m is the mass of the buoy).

Figure 5:
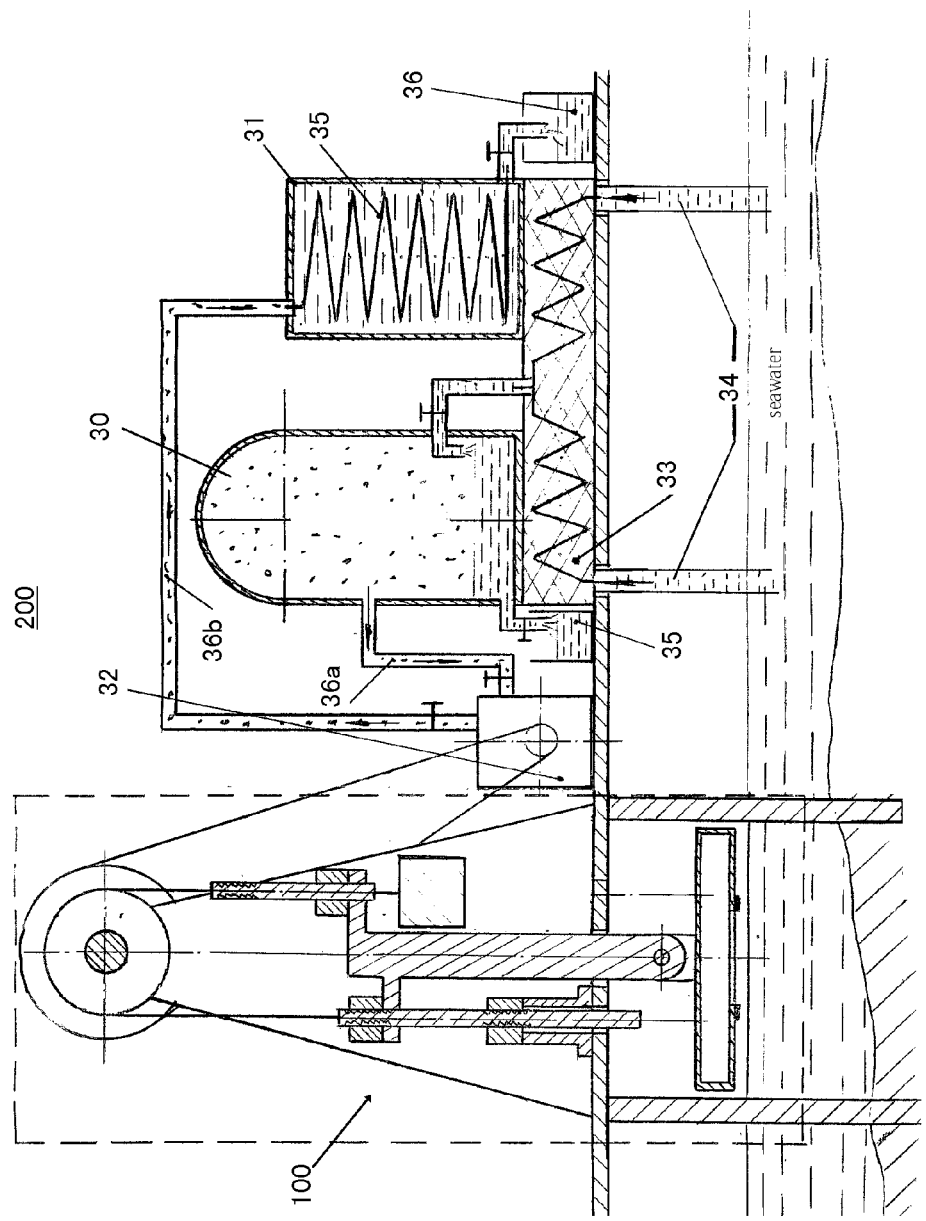
FIG. 5 illustrates a second embodiment according to the present invention—a seawater desalination system with tide buoyancy and gravity ratio energy storage.

FIG. 5 illustrates the second embodiment of the present invention, which is a seawater desalination system 200 with tide buoyancy and gravity ratio energy storage, comprising a power generation system 100 of the first embodiment, a seawater evaporation tower 30 and a steam condensation tower 31. The seawater evaporation tower 30 is configured with a vacuum pump 32, which is associated with the transmission spindle 15, that is, the transmission spindle 15 connects the vacuum pump 32 with a power transmission mechanism such that the former can drive the latter to work. In this embodiment, the power generation system 100 can only work as a dynamical system to supply driving force but not to generate electricity (the power generation sets are canceled). The seawater evaporation tower 30 in this embodiment is a barrel with a fixed volume, and is optionally provided with a water heater 33. Seawater is sucked into the water heater 33 from the water inlet 34, and after being heated in the water heater 33, it goes into the seawater evaporation tower 30. At the bottom of the seawater evaporation tower 30 is seawater, and the vacuum pump 32 connects the upper portion thereof via pipelines 36a. The vacuum pump 32 vacuumizes the seawater evaporation tower 30 to form negative pressure therein, which urges water to evaporate out from seawater, and suck the evaporated water. The vacuum pump 32 also connects the condensation tower 31 containing cooling water via pipeline 36b, in which cooling water is filled and coil pipes 35 are arranged through the cooling water. The high-pressure vapor from the vacuum pump 32 passes through the coil pipe 35 and is cooled by the cooling water, finally condensing into fresh water and entering the container 36, while strong brine discharged from the seawater evaporation tower 30 enters the container 35, in which the strong brine can be utilized to produce salt.

Figure 6:
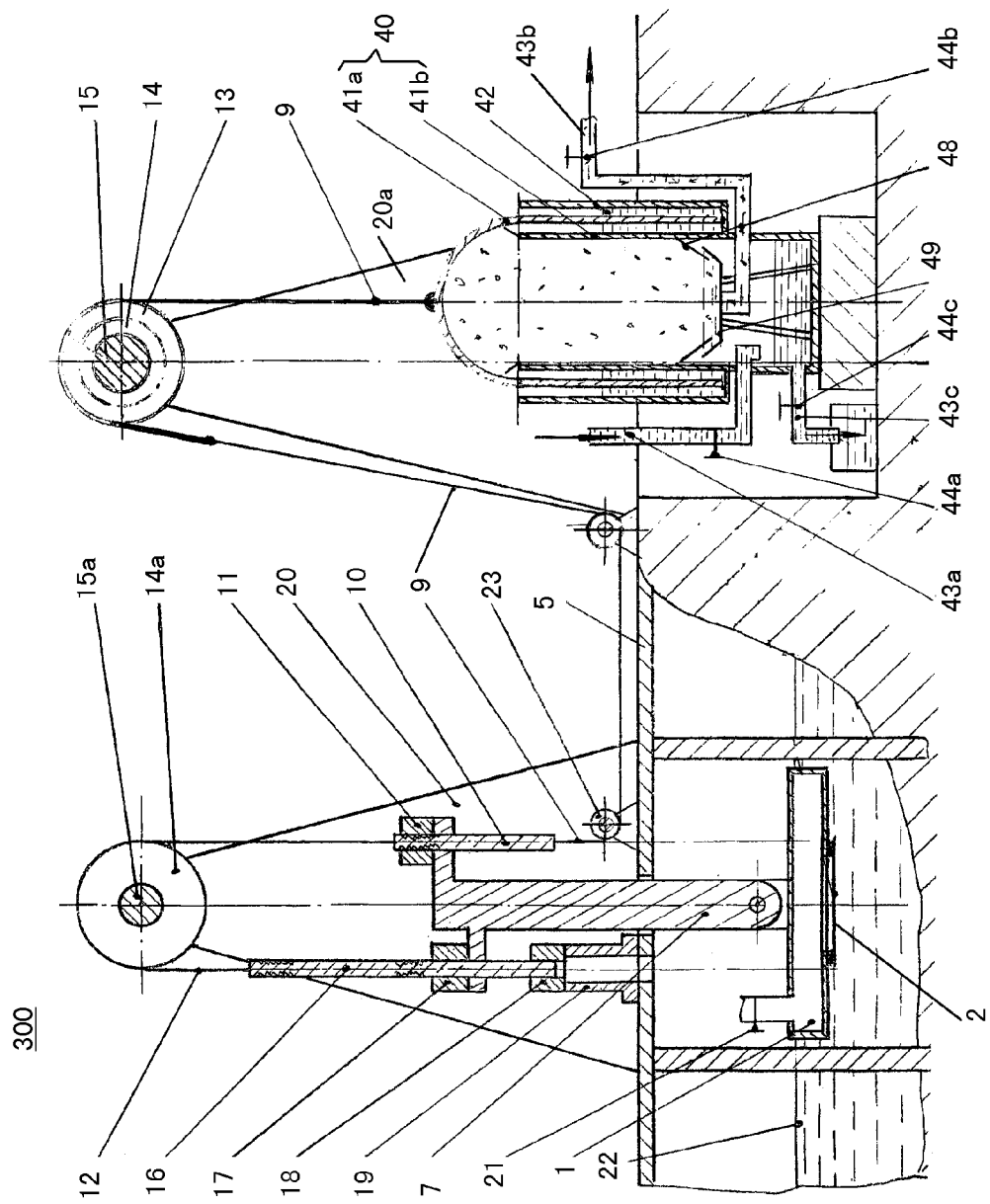
FIG. 6 illustrates a third embodiment according to the present invention—a floating and spreading seawater desalination system with tide buoyancy and gravity ratio energy storage at low tide.
Figure 7:
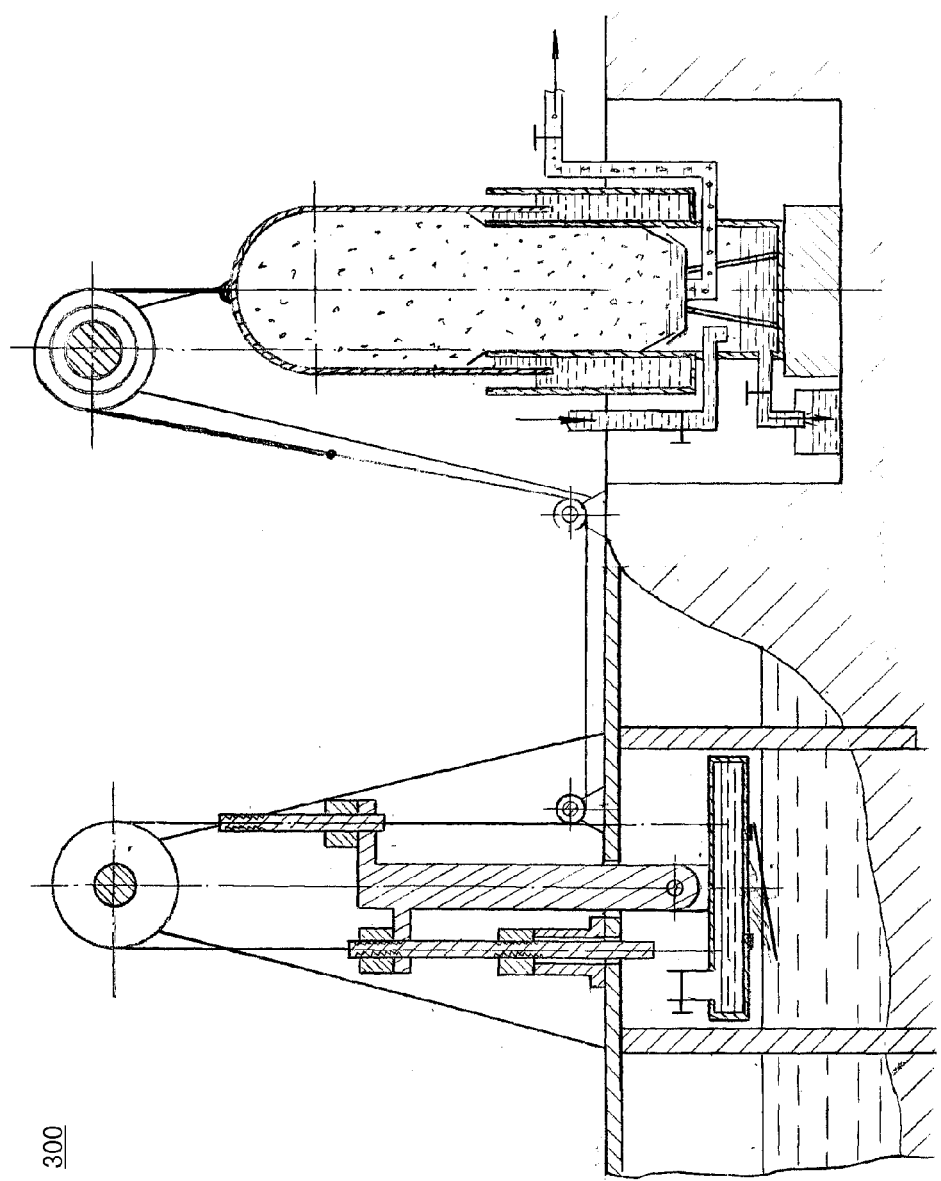
FIG. 7 illustrates the third embodiment at rising tide.

FIGS. 6 and 7 shows the third embodiment of the present invention, which is a seawater desalination system 300 with tide buoyancy and gravity ratio energy storage. The seawater desalination system 300 of the embodiment is formed on the basis of the power generation system in the first embodiment, in which the energy storage component is replaced with a floating and spreading seawater evaporation tower 40, and the rope 9 originally connecting the energy storage component is lengthened, and is guided around pulley assembly 23 to extend to the land, and likewise, the ratchet wheels 13, 14 originally driving the transmission spindle 15 is moved to the land. The ratchet wheels 13, 14, the seawater evaporation tower 40 and the like are supported by the bracket 20a on the land, while the bracket 20 on the offshore platform 5 supports the bearing spindle 15 and the fixed pulley 14a. The principle of the third embodiment on the utilization of tidal energy is identical essentially with that of the sixth embodiment thereafter.

The seawater evaporation tower 40 includes a floating barrel 41a and a stationary barrel 41b, in which the stationary barrel 41b is provided with an annular sealing groove 42, and the lower portion of the floating barrel 41a is inserted into the sealing groove, and can move up and down therein. After being inserted into the sealing groove 42, the floating barrel 41a covers the stationary barrel 41b, and when putting liquid like seawater in the sealing groove 42, the seawater evaporation tower 40 becomes sealed. Furthermore, the sealing space defined by the floating barrel 41a and the stationary barrel 41b may be varied and the sealing structure may be another type other than liquid sealing. The seawater evaporation tower 40 extends its internal space through the upward movement of the floating barrel 41a, so as to form negative pressure.

Seawater is introduced into the lower portion of the stationary barrel 41b by means of pipeline 43a, in which there is provided with a solenoid valve 44a. In the stationary barrel 41b, a condensed water collection tray 49 is supported at a height away from the bottom thereof, the tray exporting the fresh water or mixture of water and steam to the condensation tower through the pipeline 43b, in which pipeline 43b is provided with a solenoid valve 44b. At the lower portion of the stationary barrel 41b is disposed via pipelines 43c in which is provided with solenoid valve 44c. The strong brine flows into the pipeline 43c from its bottom and at last out of the stationary barrel 41b. Between the inner wall of the stationary barrel 41b and the condensed water collection tray 49, there is provided with a condensed water scraper 48, which is used to guide the condensed water into the collection tray 49. At the bottom of the collection tray 49 is disposed with a fresh water export pipe 43b. The seawater evaporation tower 40 is better to be configured with a water heater, for instance a solar water heater. The seawater in the pipeline 43a is that heated by the water heater.

The working process of this embodiment will be described hereinafter.

As illustrated in FIG. 6, during the rising tide to the falling tide, tide exerts the buoy bidirectionally, such that the rope 9 lifts the floating barrel 41a on the seawater evaporation tower 40 by a height 2H, and the volume of the seawater evaporation tower 40 extends and negative pressure is formed. After lifting a height 2H, the solenoid clutch 18 for tie rod is closed and grips the rod 16, to keep the floating barrel 41a at the highest position, continuously maintaining the vacuum degree in the seawater evaporation tower 40. With the intake solenoid valve 44a opened, the seawater, under negative pressure, flows through the solar water heater into the stationary barrel 41b. The preheated seawater, under negative pressure kept by the stationary barrel 41b, evaporates quickly, with abundant vapor emerging.

At low tide, the solenoid clutch 18 for tie rod is opened and releases the upper rod 16, and the floating barrel 41a descends under gravity, with the pressure in the stationary barrel 41b increasing, and the vapor condenses into water and flows along the inner wall of barrel and then flows downward along the condensed water scraper 48 into the collection tray 49. The floating barrel 41a descends under gravity, and the mixture of water and steam is sent to a condensation tower (not shown in FIG. 6, it can be understood with reference to FIG. 5) and condensed continuously into fresh water. The salt concentration of the seawater in the evaporation tower 40 increases with the evaporation of water. The solenoid valve 44c can be controlled to discharge the strong brine so as to produce salt, while the fresh seawater is sucked into the evaporation tower under the negative press thereof. With repeating this, it is possible to continuously produce fresh water and salt based on seawater.

Comparing with the second embodiment, the third one uses a floating and spreading seawater evaporation tower 40, without the vacuum pump.

As illustrated in FIG. 6, for the purpose of reducing the height of the bracket 20a, the evaporation tower 40 is provided in a pit.

FIGS. 7a-7c show the fourth embodiment of the present invention, which adds a pressure tank 51 and a vacuum tank 50 on the basis of the first embodiment. The vacuum tank 50 and the pressure tank 51 both connect the upper valve 21 with pipelines. The pipelines connecting the pressure tank 51 is provided with a solenoid valve 510, and the ones connecting the vacuum tank 50 with a solenoid valve 500. As illustrated in FIG. 7a, at low tide, both the solenoid valve 510 and the solenoid valve 500 assume a close state, and the empty buoy 3 is not in communication with the pressure tank 51 and the vacuum tank 50. As illustrated in FIG. 7b, at high tide, the lower valve 2 and the upper valve 21 are both opened, and tide water surges into the buoy 3 from the lower valve 2, discharging the air therein. At this stage, the solenoid valve 510 is opened, the discharged air enters the pressure tank 51. As depicted in FIG. 7c, at the stage of the buoy discharging water, the solenoid valve 510 is shut while the solenoid valve 500 is opened, and the seawater flows out of the buoy 3 under its gravity, which may form negative pressure in the buoy 3, thus vacuumizing the vacuum tank 50. The advantage of the fourth embodiment is that there are byproducts formed, that is, the pressure tank 51 and the vacuum tank 50.

Apparently, the structure that the pressure tank 51 and the vacuum tank 50 connect the upper valve 21 can be applied to the embodiments both hereinabove and hereinafter.

Figure 8:
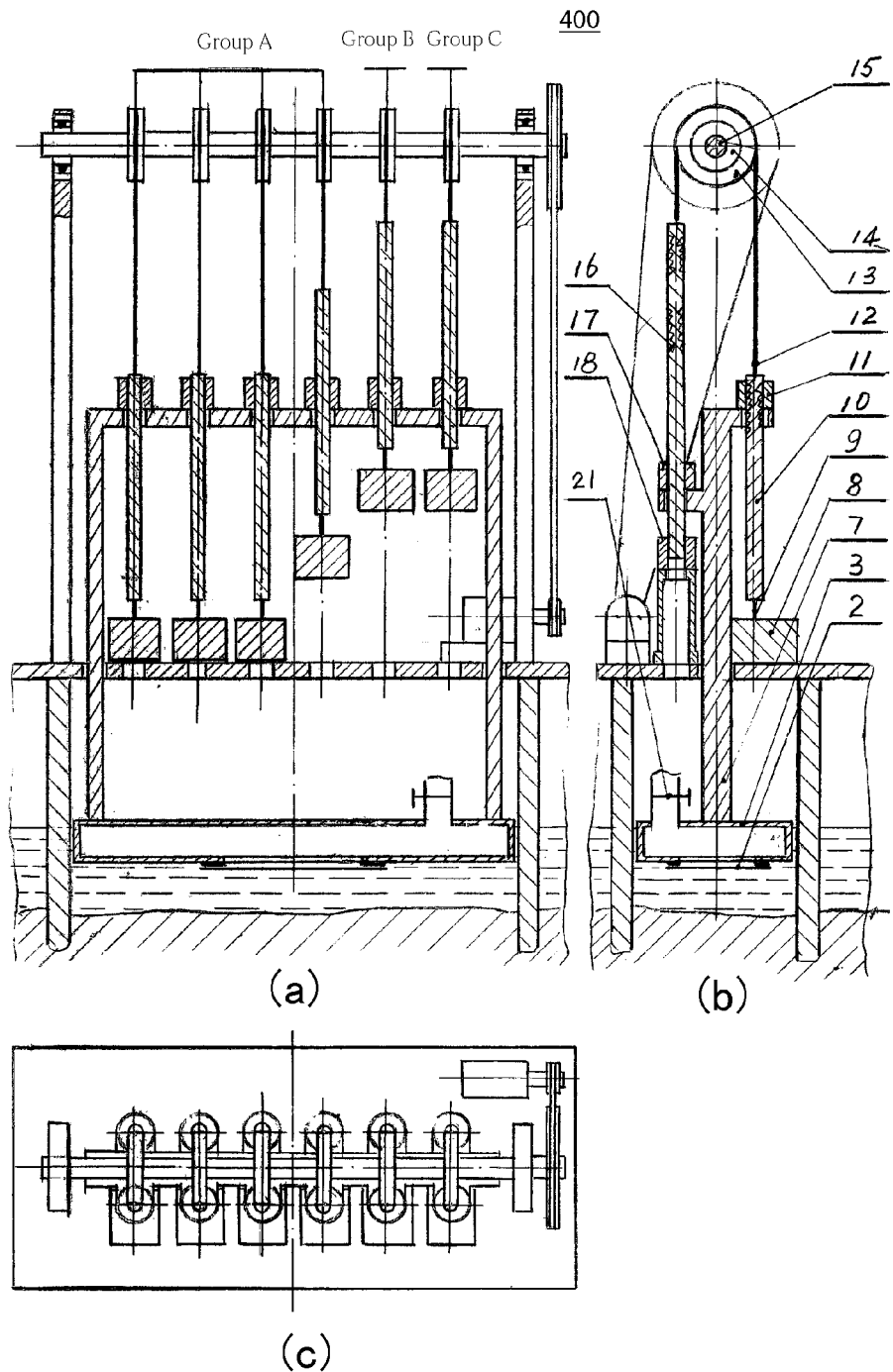
FIG. 8 illustrates a fifth embodiment according to the present invention—a continuous power generation system with tide buoyancy and gravity ratio energy storage.

FIG. 8 illustrates another embodiment of the power generation system with tide buoyancy and gravity ratio energy storage according to the present invention, i.e. the fifth embodiment. FIG. 8 only shows a system unit 400, and the whole system may be configured by at least one such system unit 400. In FIG. 8, (a) is a front view, (b) is a cross-sectional view, and (c) is a top view. The main difference from the embodiment in FIG. 1 is that, the system unit 400 in FIG. 8 has an energy storage component region with several groups of energy storage components for continuously generating electricity. FIG. 8 takes A,B,C groups as an example to illustrate, each of which components has the same way to store energy as that of the embodiment in FIG. 1, and the buoy bracket, multiple clutches, a lifting rod and a lowering rod coordinates with each other to complete the ratio energy storage. But they are different in releasing the stored energy. As shown in FIG. 8, all the groups share a buoy bracket 7. After each group of "energy storage components" are lifted to the specified position, they are kept at specified height under the effect of the positioning clutch 18, thus without the limitation from the tide cycle. The energy storage components are released and fall in a different time style upon specified procedures, so as to drive generator sets to continuously generate electricity.

With reference to FIGS. 9a-9h, the working process of the embodiment will be described as follows.

1) at initial stage (as shown in FIG. 9a):
　① the sea level: the sea level is at low tide.
　② the position of the buoy 3 and the state of the upper and lower valves: the buoy 3 is sunk into seawater under pressure of energy storage component 8, air-filled and with its upper surface just above the seawater, and in a state of "hermetic empty pontoon"; the intake and exhaust valve (the upper valve) 2 and the intake and exhaust valve (the lower valve) 21 are both closed (it can be understood referring to FIG. 2).
　③ the state of the solenoid clutches and the ratchet rods: the solenoid clutch 11 is closed and grips the ratchet rod 10; the solenoid clutch for rod 17 and 19 is opened, and the ratchet rod 16 is released.
　④ the position of the energy storage components 8: the gravity of each group "energy storage component" A, B, C is applied to the buoy bracket 7 via the engagement between the clutchs 11 and the tie rods 10, and the buoyancy which the buoy 3 is subjected to is equal to the gravity, and the energy storage components 8 is at the lowest position.
- ⑤ the state of the ratchet wheel 13, 14: the ratchet wheel 13, 14 do not rotate.
- ⑥ the state of the spindle 15: the spindle 15 does not rotate.

2) at the stage of rising tide, as shown in FIG. 9b:
- ① the sea level: the sea level rises gradually from the position at low tide to that at high tide;
- ② the position of the buoy and the state of the upper and lower valves: the buoy, under buoyancy, rises to the position at high tide and is fully filled with air; the intake and exhaust valve (upper valve) 2 and the intake and exhaust valve (lower valve) 21 are both closed (it can be understood referring to FIG. 2).
- ③ the state of the solenoid clutches and the ratchet rods: during the rising of the sea level, the solenoid clutch 11 keeps closed and grips the ratchet rod 10;
  after reaching the position at high tide, the solenoid clutch 11 is opened and releases the ratchet rod 10, while the solenoid clutch for rod 17 is closed and grips the ratchet rod 16;
  the solenoid clutch for rod 18 is opened, and the ratchet rod 16 can slide therein.
- ④ the position of the energy storage components: during the rising of the sea level, the solenoid clutch 11 mounted on the buoy bracket 7 grips the ratchet rod 10, and draws all the "energy storage components" to rise gradually to the position at high tide;
- ⑤ the state of the ratchet wheels: the energy storage components 8 are linked with the tie rod 16 via chain 12 around the outer ring 13 of the ratchet wheel, and when the energy storage components 8 ascend, the components drive the ratchet wheel 13 to rotate reversely to the spindle 15, and due to the unidirectional transmission between the ratchet wheels 13 and 14, the ratchet wheel 13 does not drive the spindle 15.
- ⑥ the state of the spindle 15: the spindle 15 does not rotate 3) at the stage of high tide, still as shown in FIG. 9b:
- ① the sea level: the sea level remains at the position at high tide;
- ② the position of the buoy and the state of the upper and lower valves: the buoy 3 remains at the position at high tide, and the electromagnetic control system is actuated to open the intake and drainage valve 2 and the intake and exhaust valve 21, seawater filling the buoy at high tide, and after that, the electromagnetic control system is actuated to shut the intake and drainage valve 2 and the intake and exhaust valve 21 and the buoy 3 becomes "a water-filled pontoon", and descends under gravity.
- ③ the state of the solenoid clutches and the ratchet rods: the solenoid clutch 11 is opened and releases the ratchet rod 10;
  the solenoid clutch 17 for rod is closed and grips the ratchet rod 16;
  the solenoid clutch 18 for rod is opened, and the ratchet rod 16 can slide therein.
- ④ the position of the energy storage components: all the "energy storage components" A, B, C assume the position at high tide;
- ⑤ the state of the ratchet wheels: both the ratchet wheels 13 and 14 do not rotate;
- ⑥ the state of the spindle: the spindle 15 does not rotate;

4) at the stage of falling tide, still as shown in FIG. 9b
- ① the sea level: the sea level descends from the position at high tide to that at low tide;
- ② the position of the buoy and the state of the upper and lower valves: the buoy 3 descends from the position at high tide, and when the intake and drainage valve 2 arrives at the position which is 0.2 m away from the sea level, the solenoid clutches for rod 17,18 are controlled to stop the buoy 3 from descending. The electromagnetic control system is actuated to open the intake and drainage valve 2 and the intake and exhaust valve 21, such that seawater is discharged by free fall; and after the seawater is drained, the intake and drainage valve 2 and the intake and exhaust valve 21 are shut and the buoy 3 restores "a hermetic empty pontoon", then the clutches 11,17, 18 is controlled such that the buoy goes into the seawater gradually by the weight of the energy storage components and itself and returns to the position at initial stage.
- ③ the state of the solenoid clutches and the ratchet rods: the solenoid clutch 11 is opened and releases the ratchet rod 10;
  when tide begins to fall, the solenoid clutch for rod 17 is closed and grips the ratchet rod 16 such that the ratchet rod 16 draws the energy storage components 8 to ascend with the falling of the buoy 3;
  when the buoy 3 falls 0.2 m close to the surface of low tide, the clutch 17 is closed and grips the tie rod 16 and at the same time the clutch 18 on the platform is closed and grips the tie rod 16 as well, so as to keep the buoy at the position close to the sea level.
- ④ the position of the energy storage components:
  energy storage components 8 is drew by the ratchet rod 16 and chain 12 and go on elevating from the position at high tide, the elevation height is the difference of the tide H minus the height of the buoy h (where h is far less than H, h can be omitted, and the elevation height of the buoy is H), therefore, the total elevation height of the energy storage component 8 approximately equals the double of the difference of the tide, that is, 2H. When the energy storage components 8 reach the highest position, the solenoid clutch for rod 18 is closed and grips the tie rod 16, and keeps the components 8 at the highest position, and at this time the potential energy of the components 8 is E=mg2H, i.e. doubles the energy of the tidal energy;
- ⑤ the state of the ratchet wheels: when the rod 16 descends, the outer ring 13 of the ratchet wheel and the spindle 15 rotate anticlockwise, without driving the spindle 15;
- ⑥ the state of the spindle: the spindle 15 does not rotate;

5) at the stage of first low tide (after the falling tide, and before the next rising tide), as shown in FIG. 9c
- ① sea level: the sea level is at low tide again
- ② the position of the buoy 3 and the state of the upper and lower valves: the buoy 3 is in seawater under pressure from the energy storage components 8, air-filled and with its upper surface just above the seawater, and assumes a state of "hermetic empty pontoon"; the intake and drainage valve 2 and the intake and exhaust valve 21 are both closed.
- ③ the state of the solenoid clutches and the ratchet rods: for the purpose of continuously generating electricity, not all the energy storage components are allowed to release energy at low tide. The total the energy storage components are divided into three groups, A, B, C, and PLC controls according to program, to open the solenoid clutch 18 for rod and release the ratchet rod 16, thereby each energy storage component descends from the highest position under gravity. Chain 12 drives the outer ring 13 and the spindle 15 to rotate in the same direction, such that the spindle 15 transfers the torque to speed reducers and generator sets. Each group releases energy in the following way:
  group A: the solenoid clutches for rod 11, 17, 18 are all opened, and releases the ratchet rod 10, 16 in such a manner that each energy storage component in group A falls in different time to release energy;
  group B: the solenoid clutch 18 is closed and grips the ratchet rod 16;
  group C: the solenoid clutch 18 is closed and grips the ratchet rod 16;
④ the position of the energy storage components, as shown in FIG. 9*c*;
  each group of energy storage component moves and releases energy in the following way:
  group A: at low tide, each energy storage component in group A falls in different time to release energy. Upon the low tide is over, all of them have reached the lowest point from the highest position 2H, with the process of releasing energy finished, and the spindle driven to rotate to generate;
  group B and C: at low tide, they keep at the highest position, and during rising tide—high side—falling side, they work in turn, in such a manner to ensure that at each stage there are always some energy storage components releasing energy, so as to drive the spindle to generate electricity continuously.
⑤ the state of the ratchet wheels:
  group A: when energy storage components thereof descend, the chain 12 drives the outer ring 13 and the spindle 15 to rotate in the same direction, such that the torque of the outer ring 13, through the ratchet wheels 13, 14, is transferred to inner ring 14, thus driving the spindle 15 to rotate.
  group B and C keep at the highest position, and their corresponding ratchet wheels do not rotate:
⑥ the state of the spindle 15: the spindle 15 is driven by the energy storage components of group A to rotate clockwise, thus the speed reducer is driven so as to bring the generator to work to generate electricity.
6) at the stage of second rising tide, as shown in FIG. 9*b*:
  ① the sea level: the sea level rises gradually from the level at low tide to that at high tide; ② the position of the buoy and the state of the upper and lower valves: the buoy rises to the position at high tide under buoyancy, with air filled; the intake and exhaust valve 2 and the intake and exhaust valve 21 are both closed.
  ③ the state of the solenoid clutches and the ratchet rods:
    group A: the solenoid clutch 11 keeps closed and grips the ratchet rod 10;
      after arriving at the position at high tide, the solenoid clutch 11 is opened and releases the ratchet rod 10, while the solenoid clutch for rod 17 is closed and grips the ratchet rod 16;
    group B: the solenoid clutch for rod 18 is opened, and releases the ratchet rod 16 so as to descend the energy storage components of group B;
    group C: the solenoid clutch for rod 18 is closed, and grips the ratchet rod 16 so as to keep the energy storage component of group C at the highest position;
  ④ the position of the energy storage components:
    group A: the solenoid clutch 11 on the buoy bracket 7 grips the ratchet rod 10, and draws all the "energy storage components" of group A to rise gradually to the position at high tide and a second cycle of energy storage begins;
    group B: at rising tide, group B descends from the highest position, and drives the spindle to work;
    group C: keep the energy storage component of group C at the highest position;
  ⑤ the state of the ratchet wheels:
    group A: the energy storage components rises, chain 12 drives the outer ring 13 of the ratchet wheel to rotate reversely to the spindle 15, and due to the unidirectional transmission between the ratchet wheels 13 and 14, the spindle 15 is not affected.
    group B: the energy storage components falls, and drives the outer ring 13 of the ratchet wheel and the spindle 15 to rotate in the same direction, and the torque is transferred to the spindle 15;
    group C: the energy storage components keep still, and the ratchet wheels do not rotate;
  ⑥ the state of the spindle 15: the spindle 15, driven by the energy storage components in group B, rotates anticlockwise, and drives speed reducers to operate on generators for generating electricity.
7) at the stage of second high tide, still as shown in FIG. 9*d*
  ① the sea level: the sea level remains at the position at high tide;
  ② the position of the buoy and the state of the upper and lower valves: the buoy 3 remains at the position at high tide, and the electromagnetic control system is actuated to open the intake and drainage valve 2 and the intake and exhaust valve 21, seawater filling the buoy at high tide, and after that, the electromagnetic control system is actuated to shut the intake and drainage valve 2 and the intake and exhaust valve 21 and the buoy 3 becomes "a water-filled pontoon", and descends under gravity.
  ③ the state of the solenoid clutches and the ratchet rods:
    group A: the solenoid clutch 11 is opened and releases the ratchet rod 10;
      the solenoid clutch for rod 17 is closed and grips the ratchet rod 16;
      the solenoid clutch for rod 18 is opened, and the ratchet rod 16 can slide therein.
    group B: the solenoid clutches 11, 17, 18 are all opened, and the ratchet rod 10 and the ratchet rod 16 slide, thus the energy storage components descending.
    group C: the solenoid clutch 18 is closed and grips the ratchet rod 16, thus the energy storage components remain at its position.
  ④ the position of the energy storage components:
    group A: the energy storage components assume the position at high tide;
    group B: the energy storage components descends;
    group C: the energy storage components remain at the highest position.
  ⑤ the state of the ratchet wheels:
    group A: the ratchet wheels do not move;
    group B: the outer rings of the ratchet wheels move along the same direction, and drive the spindle to move;
    group C: the ratchet wheels do not move;

⑥ the state of the spindle: the spindle, driven by the energy storage components of group B, rotate clockwise to drive generators to generate electricity;

8) at the stage of second falling tide, referring to FIGS. 9d and 9e:
① the sea level: the sea level descends from the position at high tide to that at low tide;
② the position of the buoy and the state of the upper and lower valves: the buoy 3 descends from the position at high tide, and when the intake and drainage valve 2 assumes the position which is 0.2 m away from the sea level, the solenoid clutches for rod 17,18 are controlled to stop the buoy 3 from descending. The electromagnetic control system is actuated to open the intake and drainage valve 2 and the intake and exhaust valve 21, such that seawater is discharged in free fall (as shown in FIG. 9); and after the seawater is drained, the intake and drainage valve 2 and the intake and exhaust valve 21 are shut and the buoy 3 restores a "hermetic empty pontoon", then the buoy goes into the seawater gradually by the weight of the energy storage components and itself and returns to the position at initial stage.
③ the state of the solenoid clutches and the ratchet rods:
group A: the solenoid clutch 11 is opened and releases the ratchet rod 10;
when tide begins to fall, the solenoid clutch for rod 17 is closed and grips the ratchet rod 16 such that the ratchet rod 16 draws the energy storage components to ascend with the falling of the buoy 3;
when the buoy 3 falls 0.2 m close to the surface of low tide, the clutch 17 is closed and grips the tie rod 16 and at the same time the clutch 18 on the platform is closed and grips the tie rod 16 as well, so as to keep the buoy at that position.
group B: the solenoid clutches for rod 11, 17, 18 are all opened, such that the ratchet rods 10,16 may slide, and the energy storage components descend to the lowest position.
group C: the solenoid clutches for rod 18 is closed and grips the ratchet rod 16, such that the energy storage components do not descend.
④ the position of the energy storage components:
group A: energy storage components are drew by the ratchet rod 16 and chain 12 and go on elevating from the position at high tide to the highest position 2H. Upon that the energy storage components reach the highest position, the solenoid clutch for rod 18 is closed and grips the tie rod 16, and keeps the components at the highest position;
group B: the solenoid clutches for rod 11, 17, 18 are all opened, such that the ratchet rods 10,16 may slide, and the energy storage components descend gradually to the lowest position.
group C: the solenoid clutches for rod 18 is closed and grips the ratchet rod 16, such that the energy storage components do not descend.
⑤ the state of the ratchet wheels:
group A: the outer rings of the ratchet wheels rotate along the reverse direction with that of the spindle, and thus do not drive the spindle;
group B: the outer rings 13 of the ratchet wheels rotate along the same direction with that of the spindle, and thus to drive the spindle 15;
group C: the outer rings 13 of the ratchet wheels do not rotate.

⑥ the state of the spindle: the spindle, driven by the energy storage components in group B, rotates clockwise so as to drive generators to generate electricity;

9) at the stage of third low tide, as shown in FIG. 9e:
① the sea level: the sea level is at low tide;
② the position of the buoy 3 and the state of the upper and lower valves: the buoy is in seawater under pressure from the energy storage components, air-filled and with its upper surface just above the seawater, and assumes a state of "hermetic empty pontoon"; the intake and drainage valve 2 and the intake and exhaust valve 21 are both closed.
③ the state of the solenoid clutches and the ratchet rods:
group A: the solenoid clutches for rod 11, 17, 18 are all opened, and releases the ratchet rod 10, 16, in such a manner that each energy storage component in group A falls in different time to release energy;
group B: the solenoid clutch for rod 11 is closed and grips the ratchet rod 10;
group C: the solenoid clutch for rod 18 is closed and grips the ratchet rod 16;
④ the position of the energy storage components;
group A: at low tide, each energy storage component in group A falls in different time to release energy. Upon the low tide is over, all of them have reached the lowest point from the highest position 2H, with the process of releasing energy finished, and the spindle driven to rotate to generate.
group B: energy storage components thereof descends to the lowest position;
group C: energy storage components thereof keeps at the highest position.
⑤ the state of the ratchet wheels:
group A: when energy storage components thereof descend, the chain drives the outer ring rotate with the spindle along the same direction, such that the torque of the outer ring, via the ratchet wheels, is transferred to inner ring, thus driving the spindle to rotate.
group B: energy storage components thereof reach the lowest position, and the ratchet wheels do not rotate;
group C: energy storage components thereof keep at the highest position, and their corresponding ratchet wheels do not rotate:
⑥ the state of the spindle: the spindle is driven by the energy storage components of group A to rotate clockwise, thus driving a speed reducer, and in turn the speed reducer drives the generator to generate electricity.

10) at the stage of third rising tide, as shown in FIG. 9f:
① the sea level: the sea level rises gradually from the level at low tide to that at high tide;
② the position of the buoy and the state of the upper and lower valves: the buoy rises to the position at high tide under buoyancy, with air filled; the intake and exhaust valve 2 and the intake and exhaust valve 21 are both closed.
③ the state of the solenoid clutches and the ratchet rods:
group A, group B: the solenoid clutch 11 keeps closed and grips the ratchet rod 10; after arriving at the position at high tide, the solenoid clutch 11 is opened and releases the ratchet rod 10, while the solenoid clutch for rod 17 is closed and grips the ratchet rod 16;

group C: the solenoid clutch for rod 11,17,18 is opened, and release the ratchet rod 16, the energy storage component descending from the highest position;
④ the position of the energy storage components:
group A, group B: the solenoid clutch 11 on the buoy bracket grips the ratchet rod 10, and draws all the "energy storage components" to rise gradually to the position at high tide and a third cycle of energy storage begins;
group C: energy storage components thereof descend from the highest position;
⑤ the state of the ratchet wheels:
group A, group B: the energy storage components rises, and the chain drives the outer ring of the ratchet wheel rotate reversely to the spindle, and due to the unidirectional transmission between the ratchet wheels 13 and 14, the spindle 15 is not affected.
group C: the energy storage components fall, and the ratchet wheel rotate in forward direction;
⑥ the state of the spindle: the spindle, driven by the energy storage components in group C, rotates clockwise, and drives speed reducers to operate on generators for generating electricity.

11) at the stage of third high tide, as shown in FIG. 9f.
① the sea level: the sea level remains at the position at high tide;
② the position of the buoy and the state of the upper and lower valves: the buoy remains at the position at high tide, and the electromagnetic control system is actuated to open the intake and drainage valve 2 and the intake and exhaust valve 21, seawater filling the buoy at high tide, and after that, the electromagnetic control system is actuated to shut the intake and drainage valve 2 and the intake and exhaust valve 21, and the buoy 3 becomes "a water-filled pontoon", and descends under gravity.
③ the state of the solenoid clutches and the ratchet rods:
group A, group B: the solenoid clutch 11 is opened and releases the ratchet rod 10; the solenoid clutch for rod 17 is closed and grips the ratchet rod 16; the solenoid clutch for rod 18 is opened, and the ratchet rod 16 can slide therein.
group C: the solenoid clutches 11, 17, 18 are all opened, and release the ratchet rod 10 and the ratchet rod 16, thus the energy storage components descending from the highest position.
④ the position of the energy storage components:
group A, group B: the energy storage components assume the position at high tide;
group C: the energy storage components thereof descends from the highest position;
⑤ the state of the ratchet wheels:
group A, group B: the energy storage components rises, and the chain drives the outer ring 13 of the ratchet wheel rotate reversely to the spindle, and due to the unidirectional transmission between the ratchet wheels 13 and 14, the spindle is not affected.
group C: the energy storage components falls, and the ratchet wheels rotate clockwise;
⑥ the state of the spindle: the spindle, driven by the energy storage components of group C, rotates anti-clockwise to drive generators to generate electricity;

12) at the stage of third falling tide, referring to FIGS. 9f and 9g:
① the sea level: the sea level descends from the position at high tide to that at low tide;
② the position of the buoy and the state of the upper and lower valves: the buoy descends from the position at high tide, and when the intake and drainage valve 2 assumes the position which is 0.2 m away from the sea level, the solenoid clutches for rod B,C are controlled to stop the buoy 3 from descending. The electromagnetic control system is actuated to open the intake and drainage valve 2 and the intake and exhaust valve 21, such that seawater is discharged in free fall (as shown in FIG. 9b); and after the seawater is drained, the intake and drainage valve 2 and the intake and exhaust valve 21 are shut and the buoy 3 restores a "hermetic empty pontoon", then the buoy goes into the seawater gradually under the weight of the energy storage components and itself and returns to the position at initial stage.
③ the state of the solenoid clutches and the ratchet rods:
group A, group B: the solenoid clutch 11 is opened and releases the ratchet rod 10, when tide begins to fall, the solenoid clutch for rod 17 is closed and grips the ratchet rod 16 such that the ratchet rod 16 draws the energy storage components to ascend with the falling of the buoy; when the buoy 3 falls 0.2 m close to the surface of low tide, the clutch 17 is closed and grips the tie rod 16 and at the same time the clutch 18 on the platform is closed and grips the tie rod 16 as well, so as to keep the buoy at that position.
group C: the solenoid clutches for rod 11, 17, 18 are all opened and release the ratchet rods 10,16, thus the energy storage components descending.
④ the position of the energy storage components:
group A, group B: energy storage components reach the highest position 2H.
group C: the energy storage components descend.
⑤ the state of the ratchet wheels:
group A, group B: the energy storage components rises, the chain drives the outer ring of the ratchet wheel rotate reversely to the spindle, and due to the unidirectional transmission between the ratchet wheels 13 and 14, the spindle is not affected.
group C: the energy storage components falls, and the ratchet wheels rotate in forward direction.
⑥ the state of the spindle: the spindle, driven by the energy storage components in group C, rotates anti-clockwise so as to drive generators to generate electricity.

13) at the stage of fourth low tide, as shown in FIG. 9h.
From this stage, the movement of the first cycle is repeated, and the groups of energy storage components, under the effect of tide, ascend and descend continuously in different time according to the above procedures, converting tidal energy into mechanical energy of the energy storage components, which drives the spindle to rotate continuously, thus generating electricity uninterruptedly.
In different cycles, there is difference only in the way of the relative movements between the energy storage components of the group B and group C.

Figure 10:
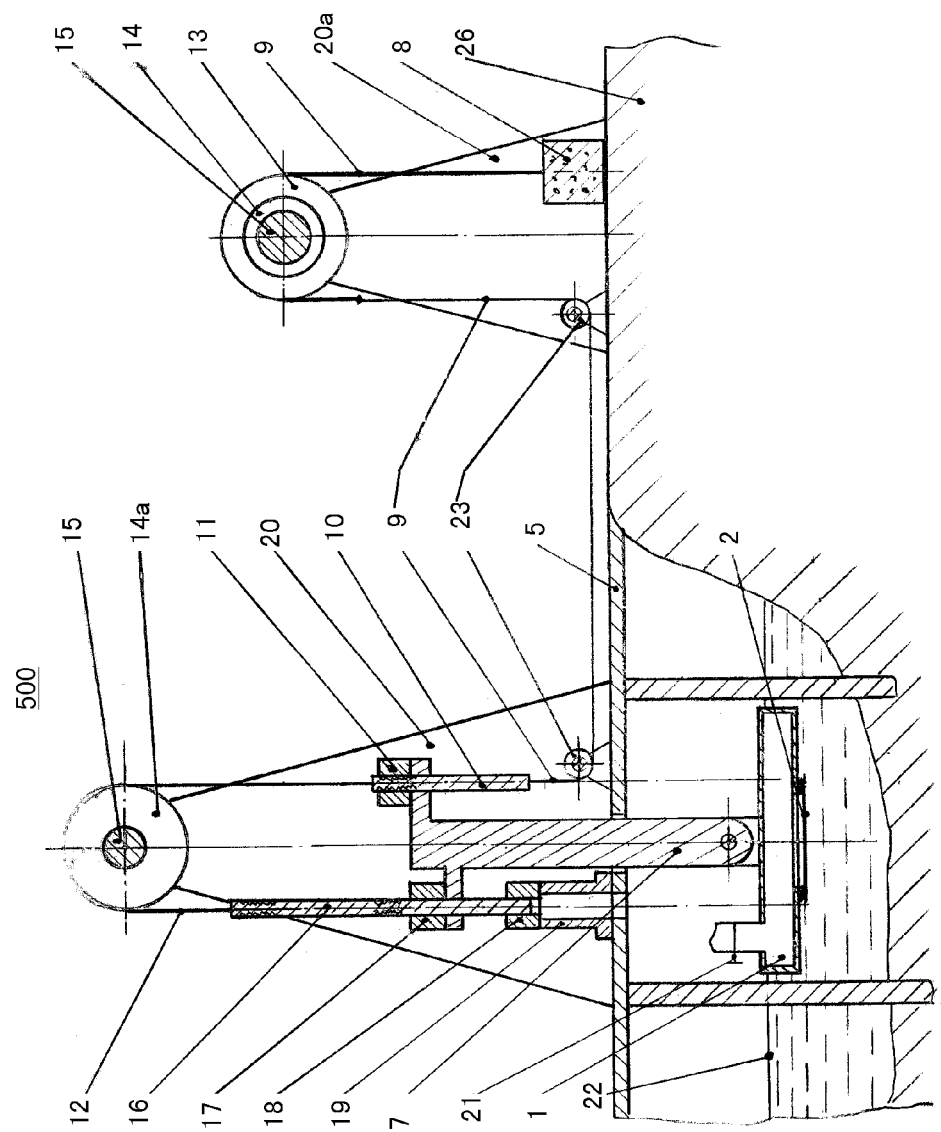
FIG. 10 illustrates the state of a sixth embodiment—a power generation system wherein the energy storage components are moved away.
Figure 11:
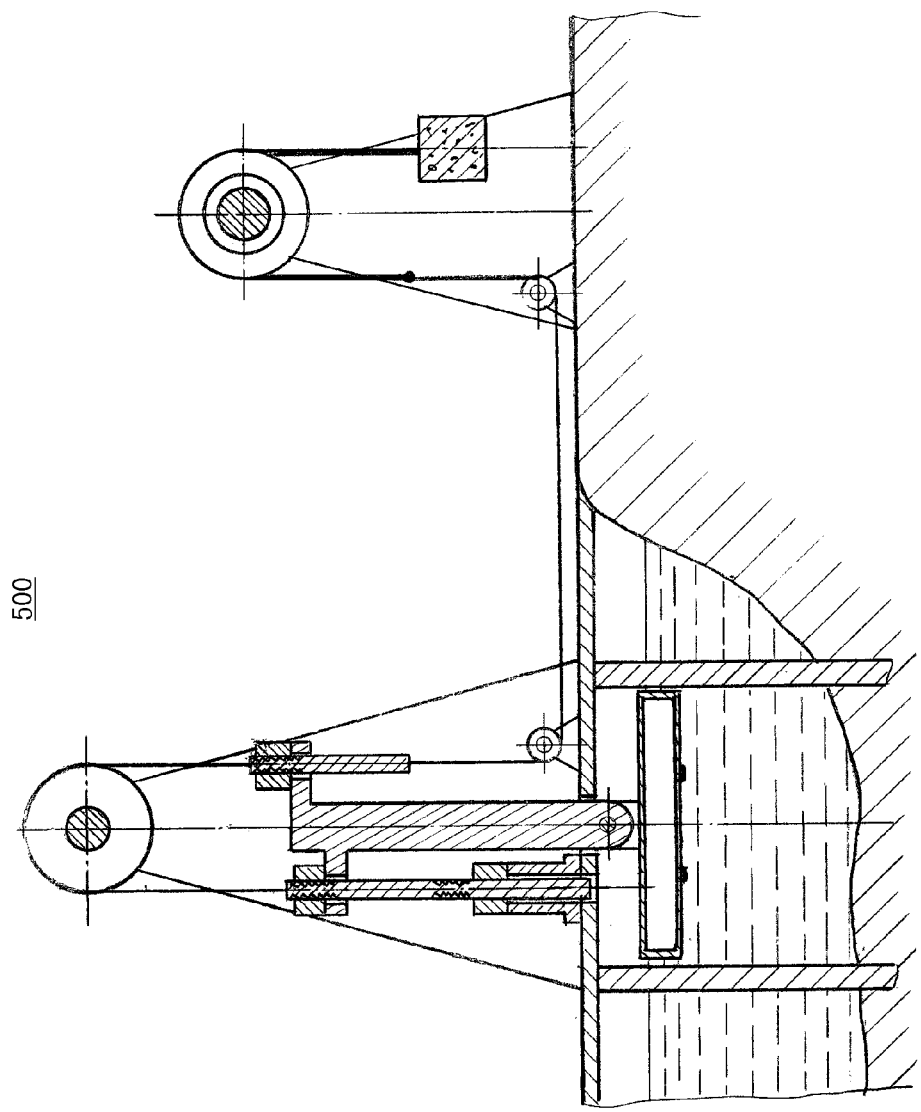
FIG. 11 illustrates the state of the sixth embodiment at high tide.
Figure 12:
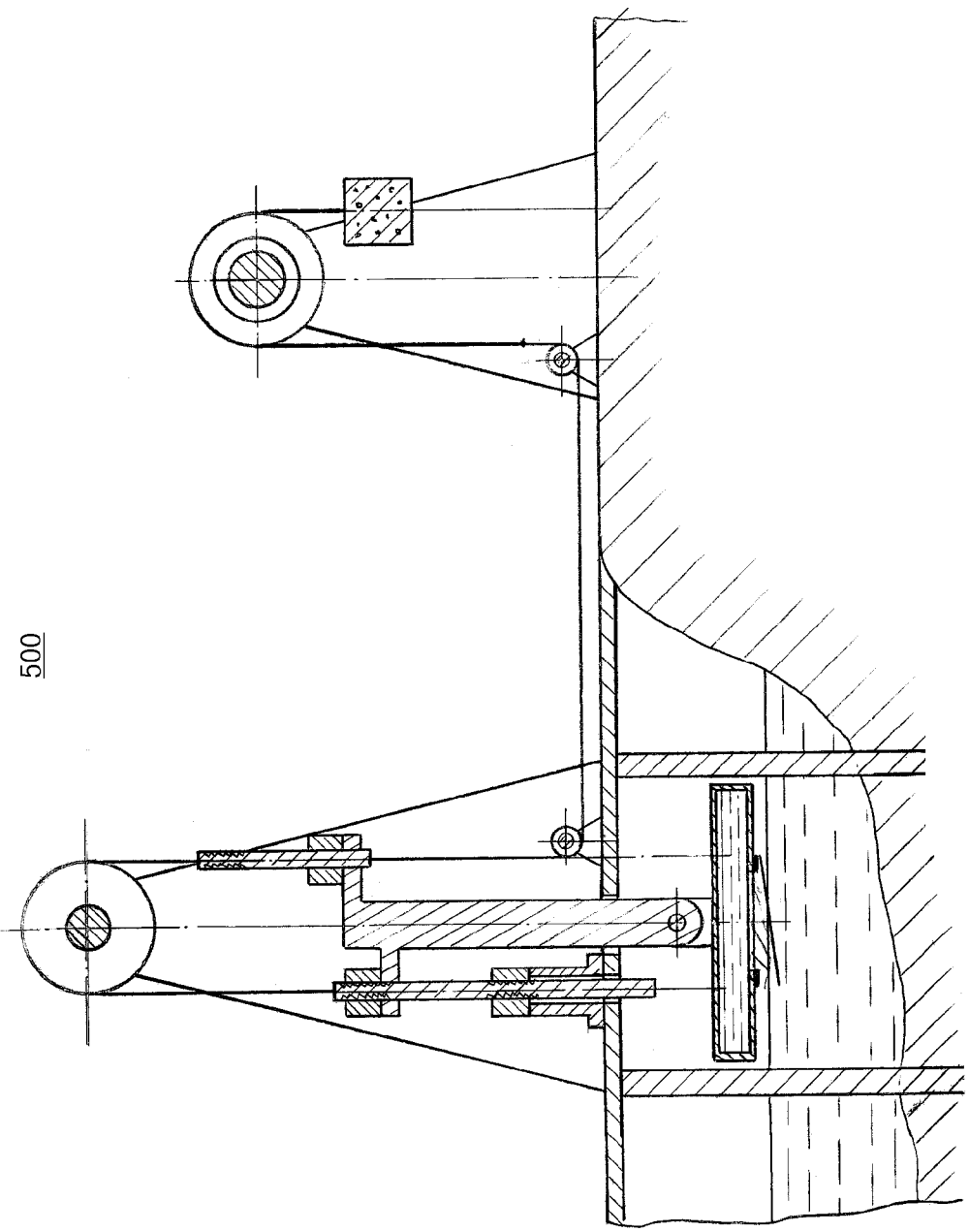
FIG. 12 illustrates the state of the sixth embodiment at falling tide.

FIG. 10 to FIG. 12 shows the sixth embodiment of the present invention, which is a system unit 500. The power generation system with tide buoyancy and gravity ratio energy storage may be configured by at least one system unit 500. The sixth embodiment is different from the first embodiment in that the energy storage components 8 and the ratchet rod 10 is connected flexibly through the rope 9 which is lengthened for meeting the need in cluster applications. Furthermore, the energy storage components 8 is placed in a position away from the platform 5, on which the transmission spindle 15 and the inner ring 14a of the ratchet wheel remains, or spindle 15 and inner ring 14a of ratchet wheel may be replaced with fixed pulleys, and the transmission spindle 15, the outer ring 13 and the inner ring 14 of the ratchet wheels in the first embodiment are moved on the land 26 away from the platform 5, and are supported by the bracket 20a, and all the operation of the whole device keeps identical. The meaning of the embodiment is that: the torques generated by multiple energy storage components 8 can be conveniently converged into one spindle 15, thus the superposition of the collected torque and energy is realized, which addresses the key problem existing in the industrialization of tidal energy. Apparently, the energy storage components of the embodiment depicted in the FIGS. 10-12 may be the ones which store energy by groups and release energy storage by groups mentioned in the fifth embodiment.

Figure 13:
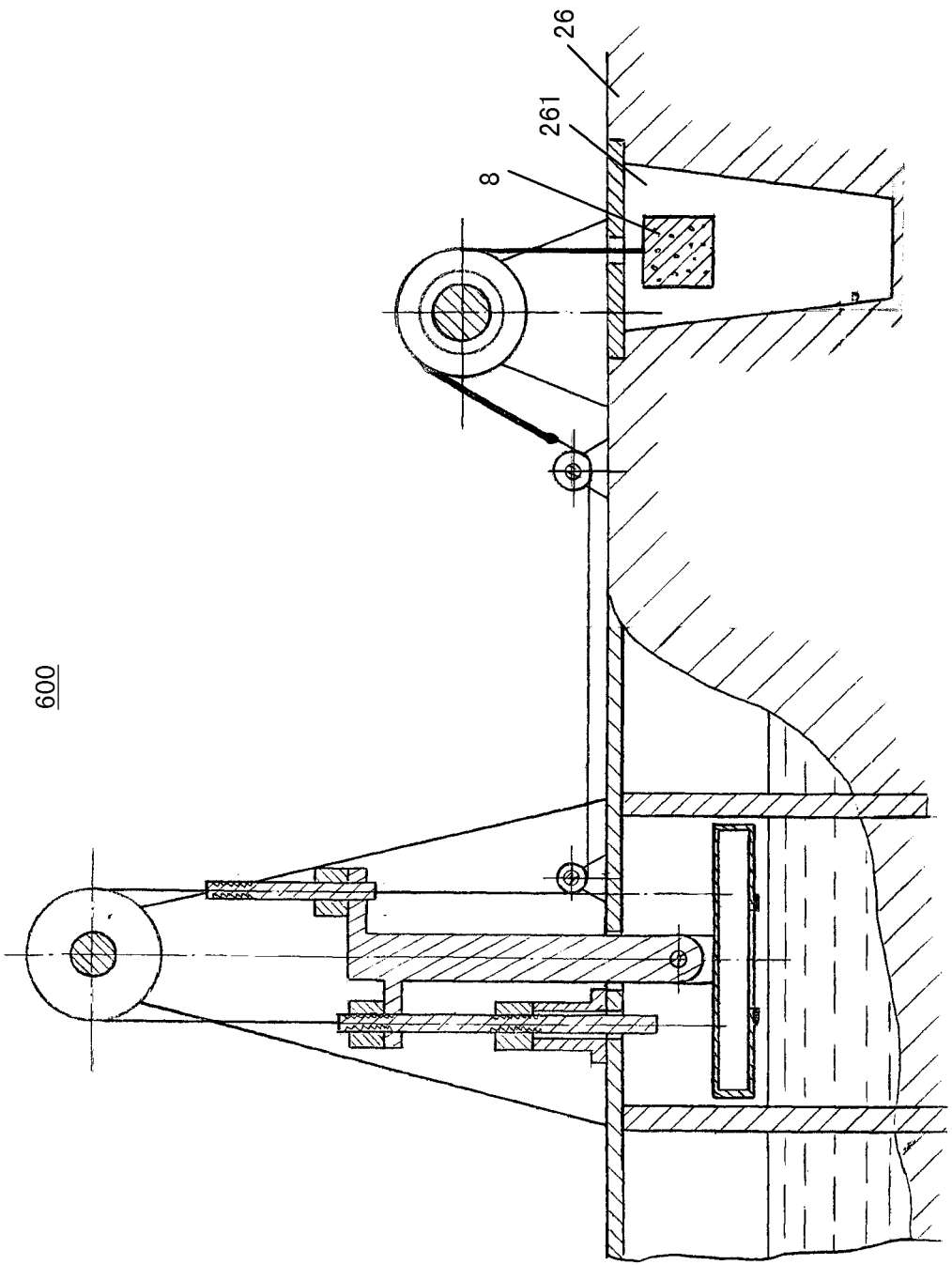
FIG. 13 illustrates the state of a seventh embodiment—a power generation system wherein the energy storage components are moved into a pit.

FIG. 13 shows the seventh embodiment of the present invention, which is presented as a system unit 600. The power generation system with tide buoyancy and gravity ratio energy storage may be configured by at least one of system unit 600. This embodiment is different from the sixth embodiment in that there is provided with a pit 261 on the land 26 below energy storage components 8, which may result in reduction of the height of the bracket 20a which supports the ratchet wheels 13, 14 and the spindle 15.

Figure 14:
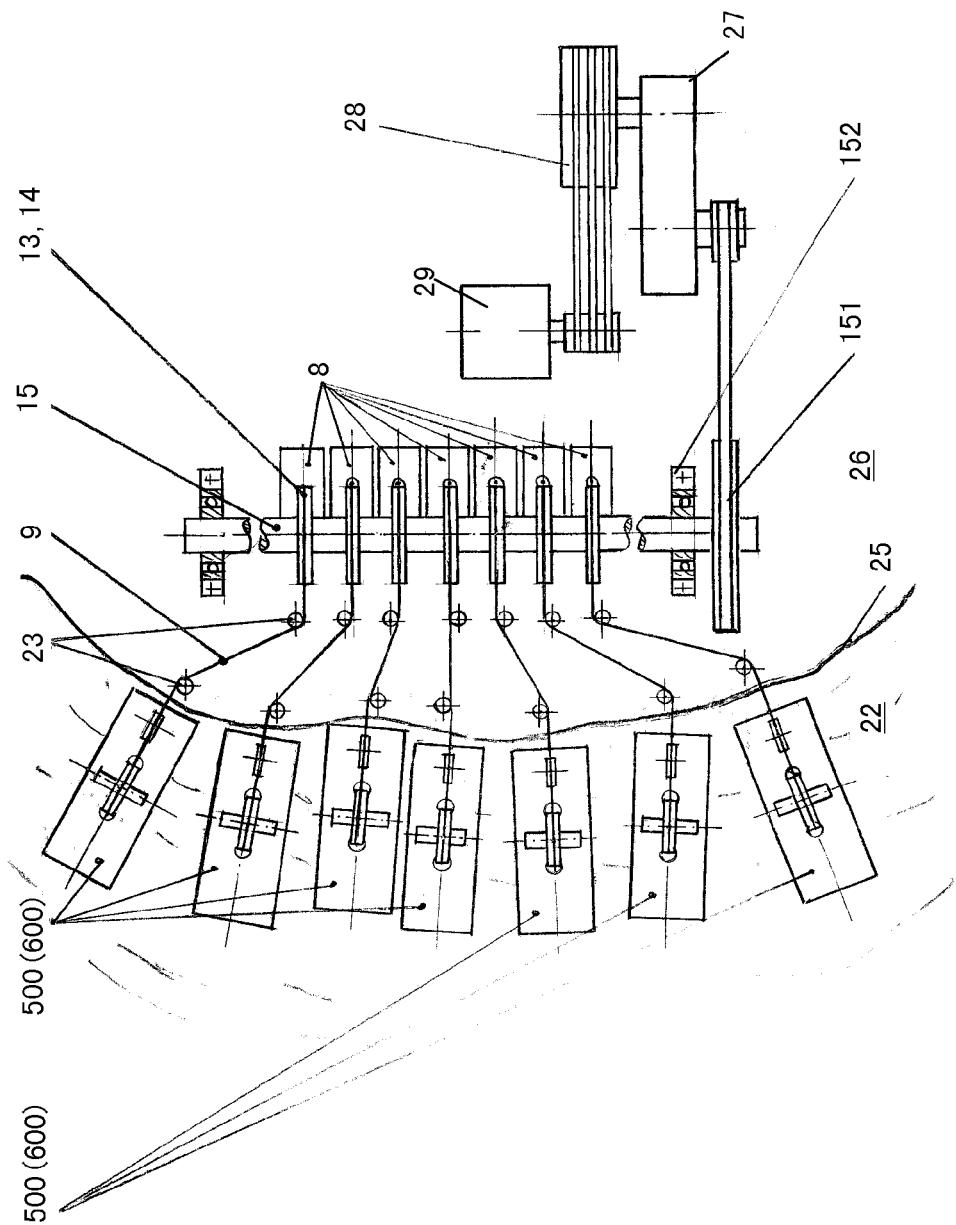
FIG. 14 is the schematic diagram showing an eighth embodiment according to the present invention—a cluster-type power generation system with tide buoyancy and gravity ratio energy storage.

FIG. 14 shows the eighth embodiment of the present invention, which is a cluster combining a plurality of system units 500 in the sixth embodiment or 600 in the seventh embodiment. As shown in FIG. 14, above the sea surface 22 is provided with a plurality of system units 500 or 600, which suspend the energy storage components 8 on the same transmission spindle 15 by the rope 9 travelling over the coastline 25 and directed through the pulley sets 23. The transmission spindle 15 is provided on the land 26, and is supported by the bearing 152. Each rope 9 has corresponding ratchet wheels 13, 14. The energy storage components 8 may drive the spindle 15 to rotate on the aforementioned principles, especially, on the principles according to the fifth embodiment. The spindle 15 drives the transmission mechanism 151 (for instance, a belt transmission mechanism 151, but not limited to it), which mechanism drives the speed increaser 27, which in turn, outputs the dynamic force to a uniform speed flywheel 28, and the uniform speed flywheel 28 drives the generation module 29 to generating electricity.

In the aforementioned embodiments, via the descending of the energy storage component 8, the spindle 15 is driven to rotate, but with too low speed, therefore improper to drive generators directly. A speed increaser 27 is needed to improve the speed, which can be a pin-cycloidal gear planetary speeding gear box which has a wide speed range (if it is of two-stage, the transmission ratio thereof may be 1:121~7569), works efficiently (above 90%), and can increase the rotation speed effectively to above 350 n/min, which is suitable to drive generator. In the aforementioned embodiments, at the output end of the speed increaser is mounted with a uniform speed flywheel 28 which prestores 1~2 cycles of tidal energy, in order to keep the speed of the generator stable when the energy storage components operate alternatively and external load varies.

Figure 15:
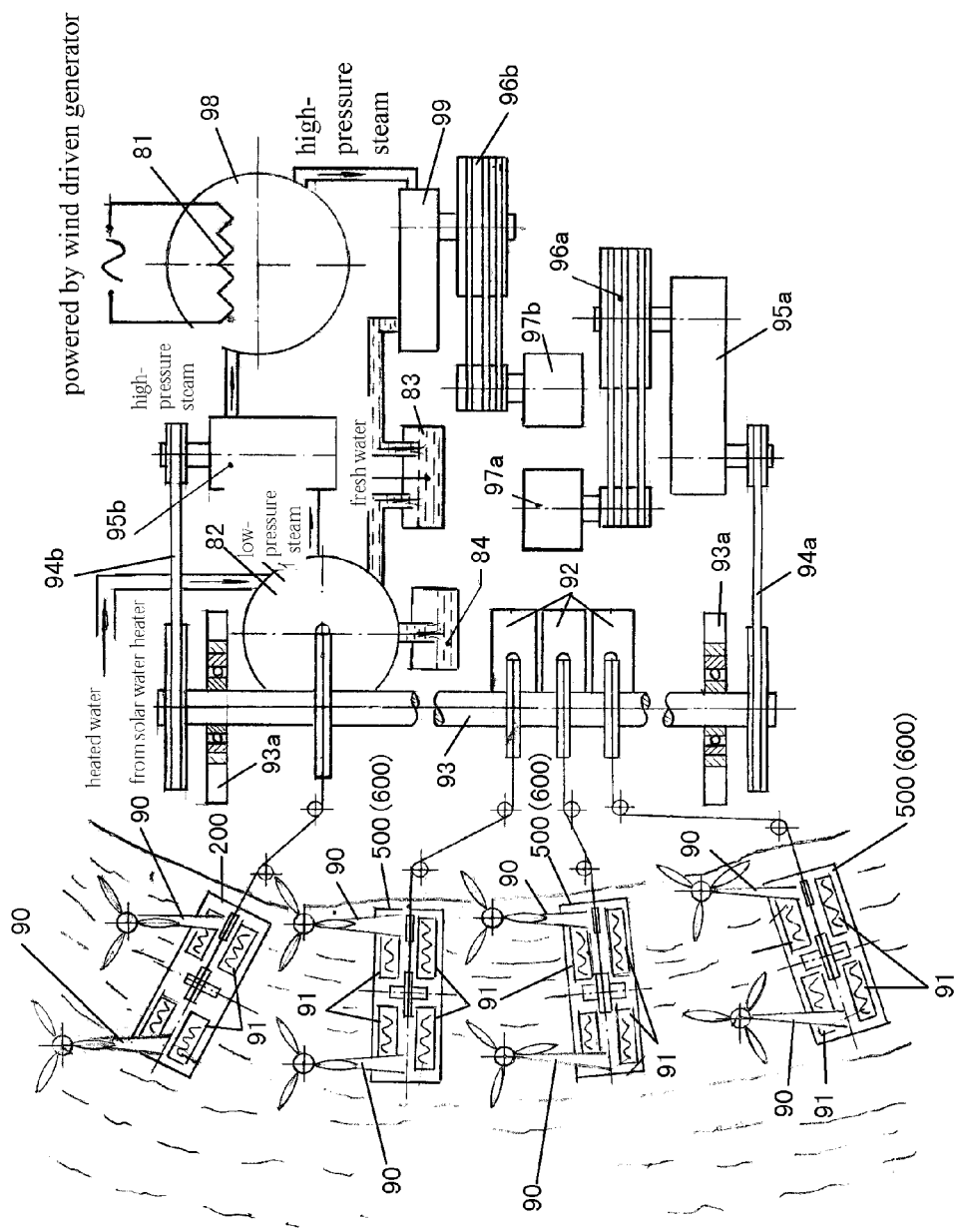
FIG. 15 is the schematic diagram showing a ninth embodiment according to the present invention—a three-dimensional energy integral utilization system with tide energy, wind force and solar energy.

FIG. 15 shows the ninth embodiment which forms a three-dimensional energy integrated utilization field with tide, wind force, and solar energy.

Traditional methods of solar power generation and wind power generation, when applied to large-scale construction, have two disadvantages, which result in large scale of investigation for power plants, and very high cost of power generation, affecting the development of the solar and wind power generation:

1. both a wind farm and a solar power plant need to occupy a large area of land, which not only increases the cost of construction and management, but also, from the perspective of resource utilization, produces great waste of land resource.

2. both wind and solar power generation need a large quantity of battery groups and inverters to ensure the continuous generation and the quality of power, which not only increases the cost of power generation, but also brings secondary pollution from chemicals produced during the long-period operation and maintenance of batteries.

As shown in FIG. 15, a three-dimensional energy integrated utilization field with tide, wind force, and the sun, includes a power generation system with tide buoyancy and gravity ratio energy storage which comprises of a plurality of (three shown in the drawing) system units 500 or 600 and a seawater desalination system with tide buoyancy and gravity 200. On each offshore platform of system units 500,600,200, there are provided with solar heaters 91 and wind driven generators 90, in which the solar heaters 91 constitute a solar heater cluster while the wind driven generators 90 constitute a wind driven generator cluster. A plurality of energy storage components in the system units 500 or 600 constitute an energy storage component cluster 92, which stores tidal energy in the accordance with the way in the aforementioned embodiments. The energy storage component cluster 92 with stored tidal energy drives the same transmission spindle 93, and at the same time, the energy storage component of the seawater desalination system 200 drives the spindle 93 as well. The spindle 93, supported by a bearing block 93a, on the one hand, drives a speed increaser box 95 by a transmission mechanism 94a, the speed increaser box 95 driving the uniform speed flywheel 96, which in turn, drives generator sets 97 to generate electricity; on the other hand, the spindle 93 drives the vacuum pump 95b by a transmission mechanism 94b, the vacuum pump 95b sucking air from the seawater evaporation tower 82 such that negative pressure is formed in the seawater evaporation tower 82, and thus the seawater heated by the solar water heater 91 is delivered to the seawater evaporation tower 82 through pipelines, and subsequently, evaporates quickly under negative pressure, to form low-pressure steam, which is sucked by vacuum pump 95b. The low-pressure steam is pressurized in the vacuum pump 95b to form high-pressure steam, and the high-pressure steam is delivered outward the steam pressure tank 98 which connects the output end of the vacuum pump 95b with pipelines. The steam pressure tank 98 is configured with electric heaters 81, the electrical power of which is provided by that generated from the wind driven generators 90, and electric heaters 81 further heats the high-pressure steam in the steam pressure tank 98. The output end of the steam pressure tank 98 connects the steam turbine 99 with pipelines, and the output high-pressure steam drives the turbine 99 to rotate. The power output shaft of steam turbine 99 connects with the uniform speed flywheel 96b, which drives the generator sets 97b. After driving the turbine, the steam loses energy and its temperature goes down to condense into fresh water, and the remained gas may be sent to a condenser, and is further processed into fresh water. As shown in the drawing, the high-pressure steam in the turbine 99 is retrieved in the form of fresh water into the fresh water receiver 83 while the brine in the seawater evaporation tower 82 enters the brine receiver 84.

As can be seen from FIG. 15, the wind driven generators 90 is mounted on the very columns which are built on the offshore platform of the system units, therefore overcoming the problem that the wind power generation systems occupy large area of land.

Similar to the embodiment shown in FIG. 5, in the embodiment in FIG. 15, the seawater evaporation tower 82 can be provided with an electrical heater. The electrical heater is powered directly by the wind driven generator 90 and heats the seawater in the evaporation tower, which effectively improves the evaporation rate, and the generating rate of the steam. The steam pressure tank 98 (also referred to as gas storage tank) may also be provided with an electrical heater 81 powered directly by the wind driven generator 90, which may increase the steam pressure in the gas storage tank so as to drive the turbine 99 to move. Due to that there is no requirement in the quality and continuity of power, it is no need to distribute power through storage batteries and inverters, decreasing significantly the cost of wind power, and improving the utilization efficiency of electrical energy.

In the embodiment of FIG. 15, there is large area on the "offshore platform" of the system units for mounting "solar water heaters", therefore overcoming the problem that the solar energy collection panels occupy large area of land. The embodiments shown in figures may employ cost-effective "coil-type solar water heaters" to utilize the solar energy to heat directly seawater. The heated seawater is sucked into the evaporation tower under the negative pressure therein. High temperature seawater may improve effectively the evaporation rate and the generating rate of the steam.

Although the seawater desalination system 200 with tide buoyancy and gravity illustrated in FIG. 15 is identical or substantially identical with that in FIG. 5, the former can be replaced with the seawater desalination system with floating and spreading seawater evaporation tower 40 shown in FIG. 6 and FIG. 7. The seawater desalination system 200 not only desalinates seawater, but also drives turbogenerators to generate electricity.

Compared with the prior art, "the offshore platform" built above the sea surface shown in the embodiment in FIG. 15 may serve to support the equipments of the tidal power generation system. But the tidal power generation equipments only cover relatively small area of the platform surface, therefore, the platform surface can be arranged as "a solar collection field", that is, a place for installing solar power generation devices or solar heating devices or the like; above the platform, there can be arranged as "a wind power collection field", that is, the space for installing wind driven generation devices and the like; below the platform, there can be arranged as "a tidal energy collection field", as a result of this, "a three-dimensional space for integrally utilizing energy" is formed. It reduces the cost of tidal power generation system and solves the problems of occupying large area of land and high operation cost existing in wind power and solar power.

Because of the combination among wind power, solar power, and tidal power, the output way of the wind energy and solar energy changes, that is, there is no need to output the wind electricity separately from the solar electricity, but the electrical energy produced by wind force is utilized directly for heating the seawater in "the seawater evaporation tower" without the use of inverters, and the solar energy is utilized directly for heating seawater by means of solar water heater 91 (for instance, coil pipe heater), and sends the heated water into "the seawater evaporation tower" without the conversion into electrical power. Having been heated by wind power and solar energy, seawater can evaporate in a higher rate and be converted into more steam, which improves the generation capacity of the tidal power generation system. The integral utilization of the three-dimensional energy can reduce significantly the cost of the system in investment and operation, and make it possible to utilize industrially clean renewable natural energy integrally.

The integral utilization of the three-dimensional energy solves the problem that wind power and solar power must employ huge battery groups and inverters, and produces fresh water and sea salt as well as electricity.

The invention claimed is:

1. A tidal energy seawater desalination system, wherein the system comprises a tidal energy power device, a seawater evaporation tower and a steam condensation tower, the seawater evaporation tower comprises a floating barrel and a stationary barrel having a bottom and a top; the floating barrel is capable of moving up and down relative to the stationary barrel, and between the floating barrel and the stationary barrel is sealed by sealing components; the floating barrel connects with a power output member of the tidal energy power device, such that the tidal power device is capable of driving the floating barrel to move relative to the stationary barrel to expand a volume of the sealed space in the barrels to form a negative pressure to evaporate seawater in the barrels under the negative pressure; the bottom of the stationary barrel is used for receiving seawater, while the top thereof connects the steam condensation tower via pipelines; the steam condensation tower connects a fresh water receiver via pipelines; the tidal energy power device comprises at least one system unit which comprises:
a buoy having a empty cavity, a controlled intake and drainage valve at the bottom thereof and a controlled intake and exhaust valve at the top thereof;
a ratio lifting system, comprising a buoy bracket, having two sides, connecting with the buoy, a lifting member, a clutch for the lifting member, a flexible transmission member, a pulley having two sides, a lowering member, and a clutch for the lowering member, in which the flexible transmission member detours the pulley and hangs the lifting member and the lowering member at the two sides of the pulley respectively, at the two sides of the buoy bracket is provided with the clutch for the lifting member, by means of which the buoy bracket is connected releasably to the lifting member, and the clutch for the lowering member, by means of which the buoy bracket is connected releasably to the lifting member; and
an offshore platform, on which is installed with the buoy and the ratio lifting system, with the seawater evaporation tower and the steam condensation tower arranged on the land; a flexible drawing member extends away from the offshore platform to a position on the land, and at the position is guided by a pulley to hang the floating barrel
wherein, the flexible drawing member is the power output member.

2. The tidal energy seawater desalination system according to claim 1, wherein the pulley on the position on the land guiding the flexible drawing member is a ratchet wheel, an inner ring of the ratchet wheel is fixed on a transmission spindle, and an outer ring thereof is detoured by the flexible drawing member which drives the outer ring; the transmission direction of the ratchet wheel is along a falling direction of the floating barrel; the floating barrel during falling is capable of driving the ratchet wheel.

* * * * *